United States Patent
Li et al.

(10) Patent No.: US 12,235,416 B2
(45) Date of Patent: Feb. 25, 2025

(54) OPTICAL IMAGING SYSTEM

(71) Applicant: Zhejiang Sunny Optical Co., Ltd, Zhejiang (CN)

(72) Inventors: Yang Li, Yuyao (CN); Lingbo He, Yuyao (CN); Fujian Dai, Yuyao (CN); Liefeng Zhao, Yuyao (CN)

(73) Assignee: Zhejiang Sunny Optical Co., Ltd, Zhejiang (CN)

( * ) Notice: Subject to any disclaimer, the term of this patent is extended or adjusted under 35 U.S.C. 154(b) by 491 days.

(21) Appl. No.: 17/685,949

(22) Filed: Mar. 3, 2022

(65) Prior Publication Data
US 2022/0283410 A1    Sep. 8, 2022

(30) Foreign Application Priority Data
Mar. 8, 2021  (CN) .......................... 202110249324.9

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 13/0045; G02B 9/64; G02B 13/18; G02B 5/005
See application file for complete search history.

(56) References Cited

U.S. PATENT DOCUMENTS

| 2015/0198791 A1* | 7/2015 | Kubota | G02B 27/0025 359/689 |
| 2016/0299319 A1* | 10/2016 | Tang | G02B 13/0045 |
| 2019/0094494 A1* | 3/2019 | Hsu | G02B 13/0045 |
| 2020/0073085 A1* | 3/2020 | Huang | G02B 9/64 |
| 2020/0209566 A1* | 7/2020 | Wang | G02B 9/64 |
| 2021/0018729 A1* | 1/2021 | Li | G02B 13/0045 |
| 2021/0223515 A1* | 7/2021 | Tseng | G02B 9/64 |
| 2021/0389565 A1* | 12/2021 | Wang | G02B 13/0045 |
| 2021/0405330 A1* | 12/2021 | Dang | G02B 9/64 |
| 2022/0099938 A1* | 3/2022 | Zhao | G02B 9/64 |
| 2022/0244505 A1* | 8/2022 | Chen | G02B 7/09 |

FOREIGN PATENT DOCUMENTS

| CN | 107577034 A | 1/2018 | |
| CN | 108663780 A | * 10/2018 | ......... G02B 13/0045 |
| JP | 2015-72405 A | 4/2015 | |

OTHER PUBLICATIONS

Machine translation of CN-108663780-A (Year: 2018).*

* cited by examiner

*Primary Examiner* — Darryl J Collins
*Assistant Examiner* — Matthew Y Lee
(74) *Attorney, Agent, or Firm* — Sughrue Mion, PLLC

(57) ABSTRACT

The present disclosure discloses an optical imaging system. The optical imaging system comprises, sequentially along an optical axis from an object side to an image side, a stop; a first lens, having a positive refractive power; a second lens, having a refractive power; a third lens, having a refractive power; a fourth lens, having a negative refractive power, an object-side surface of the fourth lens is a convex surface; a fifth lens, having a negative refractive power; a sixth lens, having a refractive power; and a seventh lens, having a refractive power. Here, one of the first to seventh lenses is an aspheric lens made of glass, and a radius of curvature R2 of an image-side surface of the first lens and a radius of curvature R1 of an object-side surface of the first lens satisfy:

$2.5 \leq (R2+R1)/R2-R1) < 3.0$.

18 Claims, 11 Drawing Sheets

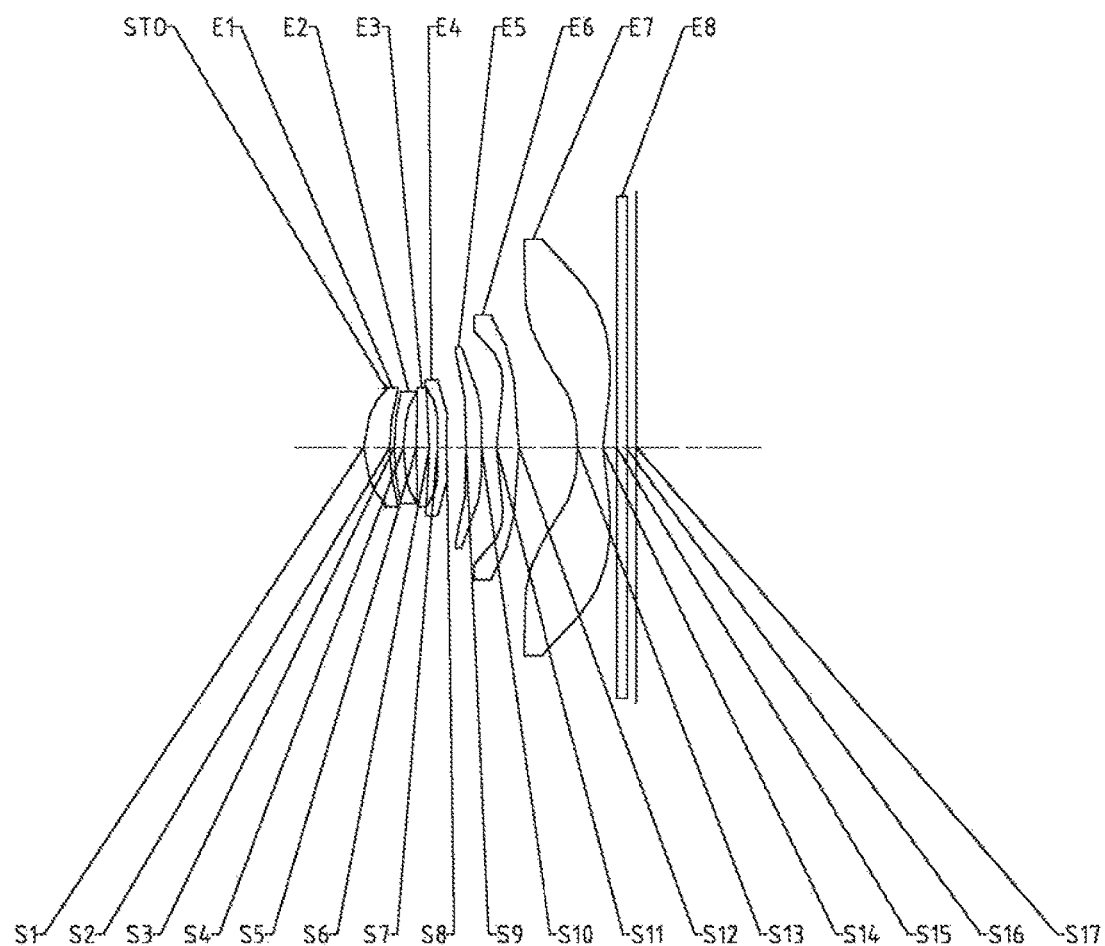
Fig. 13
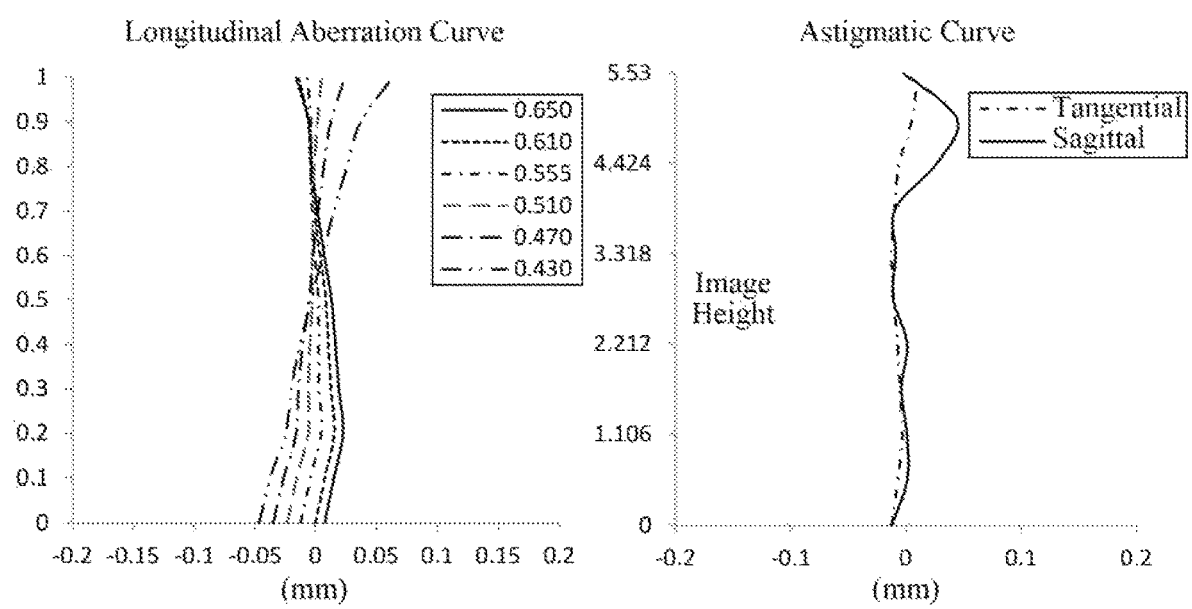
Fig. 14A
Fig. 14B

OPTICAL IMAGING SYSTEM

CROSS-REFERENCE TO RELATED APPLICATIONS

This application claims the priority from Chinese Patent Application No. 202110249324.9, filed in the National Intellectual Property Administration (CNIPA) on Mar. 8, 2021, the content of which is hereby incorporated by reference in its entirety.

TECHNICAL FIELD

The present disclosure relates to the field of optical element, and more specifically to an optical imaging system.

BACKGROUND

In recent years, with the rapid development of portable electronic products such as smart phones, higher requirements are put forward for the shooting quality of the optical imaging system equipped on portable electronic products.

In order to make the optical imaging system have better shooting effect, the size of the photosensitive element of the optical imaging system may be increased, thus the optical imaging system may have high pixel imaging quality. However, with the increase of the size of the photosensitive element of the optical imaging system, the size of the optical imaging lens assembly corresponding to the photosensitive element will also increase accordingly, which is not conducive to the development trend of lightness and thinness of the optical imaging system, but also affects the user experience of portable electronic products equipped with the optical imaging system. In addition, the ambient temperature will also affect the imaging quality of the optical imaging system.

Therefore, it is urgent to provide an optical imaging system with high pixel, light weight and good temperature stability.

SUMMARY

An aspect of the present disclosure is to provide an optical imaging system, comprising, sequentially along an optical axis from an object side to an image side: a stop; a first lens, having a positive refractive power; a second lens, having a positive refractive power or a negative refractive power; a third lens, having a positive refractive power or a negative refractive power; a fourth lens, having a negative refractive power, an object-side surface of the fourth lens is a convex surface; a fifth lens, having a negative refractive power; a sixth lens, having a positive refractive power or a negative refractive power; and a seventh lens, having a positive refractive power or a negative refractive power. Here, one of the first to seventh lenses is an aspheric lens made of glass; and a radius of curvature R2 of an image-side surface of the first lens and a radius of curvature R1 of an object-side surface of the first lens satisfy: $2.5 \leq (R2+R1)/(R2-R1)<3.0$.

According to some implementations of the present disclosure, half of a maximal field-of-view Semi-FOV of the optical imaging system may satisfy: Semi-FOV≥45°.

According to some implementations of the present disclosure, an effective focal length f4 of the fourth lens, an effective focal length f2 of the second lens, and an effective focal length f3 of the third lens may satisfy: $5.0<|f4/f2-f3/f2|<10.0$.

According to some implementations of the present disclosure, a total effective focal length f of the optical imaging system and an entrance pupil diameter EPD of the optical imaging system may satisfy: f/EPD<2.0.

According to some implementations of the present disclosure, an effective focal length f1 of the first lens, an effective focal length f6 of the sixth lens, and an effective focal length f7 of the seventh lens may satisfy: $2.5<|f1/f6-f1/f7|<3.5$.

According to some implementations of the present disclosure, a spacing distance T23 between the second lens and the third lens on the optical axis, a spacing distance T12 between the first lens and the second lens on the optical axis, and a spacing distance T34 between the third lens and the fourth lens on the optical axis may satisfy: $1.0<T23/(T12+T34)<1.5$.

According to some implementations of the present disclosure, a radius of curvature R7 of the object-side surface of the fourth lens, a total effective focal length f of the optical imaging system, and a radius of curvature R8 of an image-side surface of the fourth lens may satisfy: $3.0<R7/f+R8/f<8.0$.

According to some implementations of the present disclosure, a radius of curvature R13 of an object-side surface of the seventh lens and a radius of curvature R14 of an image-side surface of the seventh lens may satisfy: $-3.5<R13/R14<-2.5$.

According to some implementations of the present disclosure, a spacing distance T67 between the sixth lens and the seventh lens on the optical axis and a spacing distance T45 between the fourth lens and the fifth lens on the optical axis may satisfy: $2.5<T67/T45<3.5$.

According to some implementations of the present disclosure, a center thickness CT1 of the first lens on the optical axis, a center thickness CT6 of the sixth lens on the optical axis, and a center thickness CT7 of the seventh lens on the optical axis may satisfy: $2.0<CT1/CT6+CT1/CT7<2.5$.

According to some implementations of the present disclosure, half of a diagonal length ImgH of an effective pixel area on an image plane of the optical imaging system may satisfy: ImgH≥5.0 mm.

According to some implementations of the present disclosure, a sum ΣAT of spacing distances between any two adjacent lenses in the first to seventh lenses on the optical axis, and half of a maximal field-of-view Semi-FOV of the optical imaging system may satisfy: $1.0<\Sigma AT/\tan(\text{Semi-FOV})<3.0$.

According to some implementations of the present disclosure, a distance TTL from an object-side surface of the first lens to an image plane of the optical imaging system on the optical axis, and half of a diagonal length ImgH of an effective pixel area on the image plane of the optical imaging system may satisfy: TTL/ImgH<1.2.

Another aspect of the present disclosure is to provide an optical imaging system, comprising, sequentially along an optical axis from an object side to an image side: a stop; a first lens, having a positive refractive power; a second lens, having a positive refractive power or a negative refractive power; a third lens, having a positive refractive power or a negative refractive power; a fourth lens, having a negative refractive power, an object-side surface of the fourth lens is a convex surface; a fifth lens, having a negative refractive power; a sixth lens, having a positive refractive power or a negative refractive power; and a seventh lens, having a positive refractive power or a negative refractive power. Here, one of the first to seventh lenses is an aspheric lens made of glass; and a center thickness CT1 of the first lens on the optical axis, a center thickness CT6 of the sixth lens on the optical axis, and a center thickness CT7 of the seventh lens on the optical axis satisfy: 2.0<CT1/CT6+CT1/CT7<2.5.

According to some implementations of the present disclosure, half of a maximal field-of-view Semi-FOV of the optical imaging system may satisfy: Semi-FOV≥45°.

According to some implementations of the present disclosure, an effective focal length f4 of the fourth lens, an effective focal length f2 of the second lens, and an effective focal length f3 of the third lens may satisfy: 5.0<|f4/f2−f3/f2|<10.0.

According to some implementations of the present disclosure, a total effective focal length f of the optical imaging system and an entrance pupil diameter EPD of the optical imaging system may satisfy: f/EPD<2.0.

According to some implementations of the present disclosure, an effective focal length f1 of the first lens, an effective focal length f6 of the sixth lens, and an effective focal length f7 of the seventh lens may satisfy: 2.5<|f1/f6−f1/f7|<3.5.

According to some implementations of the present disclosure, a radius of curvature R2 of an image-side surface of the first lens and a radius of curvature R1 of an object-side surface of the first lens may satisfy: 2.5≤(R2+R1)/(R2−R1)<3.0.

According to some implementations of the present disclosure, a radius of curvature R7 of the object-side surface of the fourth lens, a total effective focal length f of the optical imaging system, and a radius of curvature R8 of an image-side surface of the fourth lens may satisfy: 3.0<R7/f+R8/f<8.0.

According to some implementations of the present disclosure, a radius of curvature R13 of an object-side surface of the seventh lens and a radius of curvature R14 of an image-side surface of the seventh lens may satisfy: −3.5<R13/R14<−2.5.

According to some implementations of the present disclosure, a spacing distance T67 between the sixth lens and the seventh lens on the optical axis and a spacing distance T45 between the fourth lens and the fifth lens on the optical axis may satisfy: 2.5<T67/T45<3.5.

According to some implementations of the present disclosure, half of a diagonal length ImgH of an effective pixel area on an image plane of the optical imaging system may satisfy: ImgH≥5.0 mm.

According to some implementations of the present disclosure, a sum ΣAT of spacing distances between any two adjacent lenses in the first to seventh lenses on the optical axis, and half of a maximal field-of-view Semi-FOV of the optical imaging system may satisfy: 1.0<ΣAT/tan(Semi-FOV)<3.0.

According to some implementations of the present disclosure, a distance TTL from an object-side surface of the first lens to an image plane of the optical imaging system on the optical axis, and half of a diagonal length ImgH of an effective pixel area on the image plane of the optical imaging system may satisfy: TTL/ImgH<1.2.

The implementations of the present disclosure adopt a lens assembly structure with seven lenses. By reasonably distributing the refractive power, surface type, central thickness of each lens and the axial spacing between the lenses, the optical imaging system can have at least one of the beneficial effects of high pixel, light and thin, good temperature performance, and the like.

BRIEF DESCRIPTION OF THE DRAWINGS

In combination with the accompanying drawings, other features, objectives and advantages of the present disclosure will become more apparent through the detailed description of the following non limiting implementations. In the drawings:

FIG. 13 is a schematic structural diagram of an optical imaging system according to Embodiment 7 of the present disclosure; and FIGS. 14A to 14C respectively show a longitudinal aberration curve, an astigmatic curve and a distortion curve of the optical imaging system according to Embodiment 7.

DETAILED DESCRIPTION OF EMBODIMENTS

Figure 1:
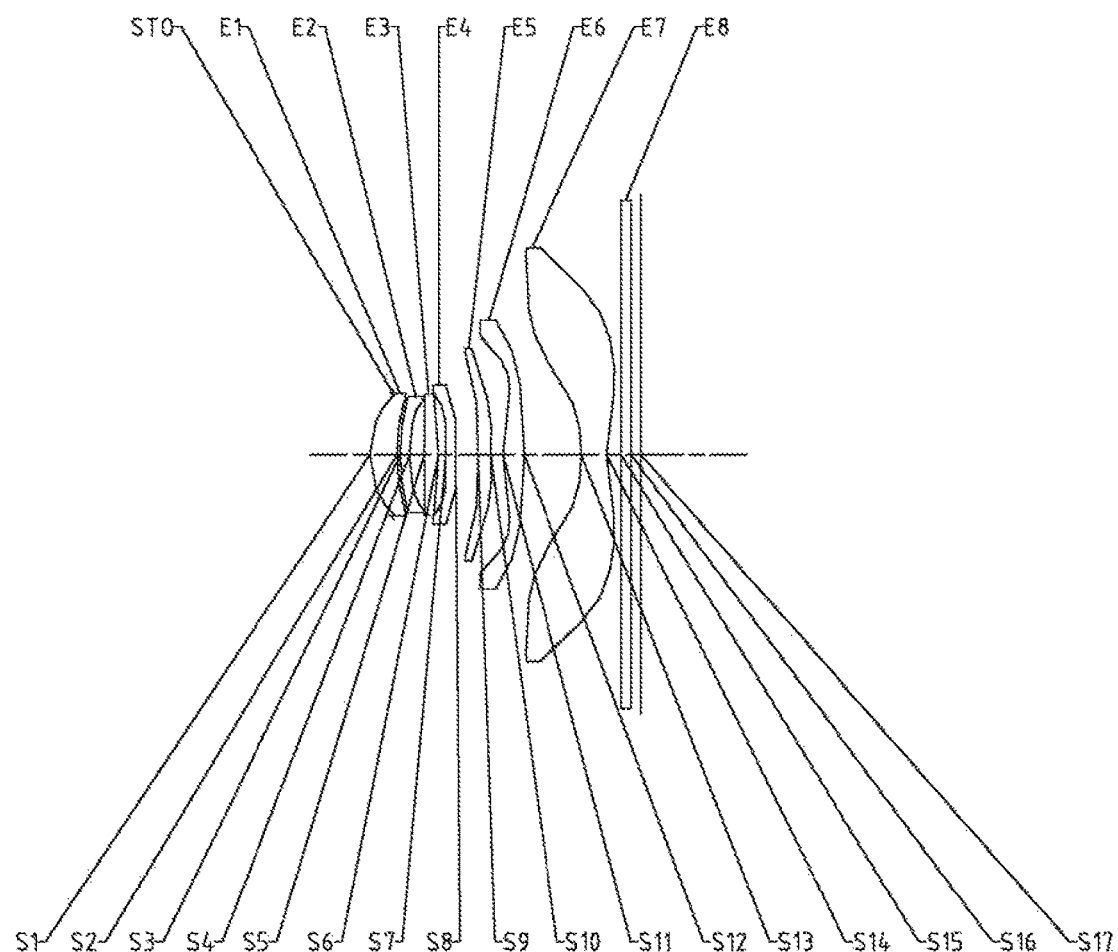
FIG. 1 is a schematic structural diagram of an optical imaging system according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure". Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

An optical imaging system according to exemplary implementations of the present disclosure may include, for example, seven lenses having refractive powers, which are respectively a first lens, a second lens, a third lens, a fourth lens, a fifth lens, a sixth lens and a seventh lens. The seven lenses are arranged in sequence along an optical axis from an object side to an image side. Any two adjacent lenses in the first to seventh lenses may have an air spacing therebetween.

In exemplary embodiments, the optical imaging system may also include at least one stop. The stop may be arranged at an appropriate position as required, for example, between the object side and the first lens.

In exemplary implementations, the first lens may have a positive refractive power or a negative refractive power. The second lens may have a positive refractive power or a negative refractive power. The third lens may have a positive refractive power or a negative refractive power. The fourth lens may have a negative refractive power, and an object-side surface of the fourth lens may be a convex surface. The fifth lens may have a negative refractive power. The sixth lens may have a positive refractive power or a negative refractive power. The seventh lens may have a positive refractive power or a negative refractive power.

In exemplary implementations, one of the first to seventh lenses may be a glass lens. The coefficient of thermal expansion of glass material is low, and the glass material is less affected by ambient temperature. Through the reasonable coordination of the materials of the lenses, the optical imaging system can maintain high resolution in a large temperature range.

In exemplary implementations, the optical imaging system according to the present disclosure may satisfy $1.0<T23/(T12+T34)<1.5$. Here, T23 is a spacing distance between the second lens and the third lens on the optical axis, T12 is a spacing distance between the first lens and the second lens on the optical axis, and T34 is a spacing distance between the third lens and the fourth lens on the optical axis. The optical imaging system satisfies: $1.0<T23/(T12+T34)<1.5$, which can make the optical imaging system has the characteristics of being light and thin, thereby helping to reduce the size of the system. More specifically, T23, T12 and T34 may satisfy: $1.0<T23/(T12+T34)<1.40$.

In exemplary implementations, the optical imaging system according to the present disclosure may satisfy Semi-FOV≥45°. Here, Semi-FOV is half of a maximal field-of-view of the optical imaging system. The optical imaging system satisfies: Semi-FOV≥45°, which can ensure that the optical imaging system has a large imaging range. More specifically, Semi-FOV may satisfy: Semi-FOV>47.0°.

In exemplary implementations, the optical imaging system according to the present disclosure may satisfy $5.0<|f4/f2-f3/f2|<10.0$. Here, f4 is an effective focal length of the fourth lens, f2 is an effective focal length of the second lens, and f3 is an effective focal length of the third lens. The optical imaging system satisfies: $5.0<|f4/f2-f3/f2|<10.0$, which can reduce the aberration of the optical imaging system and improve the imaging quality of the system. More specifically, f4, f2 and f3 may satisfy: $5.40<|f4/f2-f3/f2|<9.70$.

In exemplary implementations, the optical imaging system according to the present disclosure may satisfy f/EPD<2.0. Here, f is a total effective focal length of the optical imaging system, and EPD is an entrance pupil diameter of the optical imaging system. The optical imaging system satisfies: f/EPD<2.0, which can ensure that the optical imaging system has a large F-number and increase the amount of light that can enter the system, thereby enhancing the imaging effect of the system in a dark room condition. More specifically, f and EPD may satisfy: f/EPD<1.95.

In exemplary implementations, the optical imaging system according to the present disclosure may satisfy $2.5<|f1/f6-f1/f7|<3.5$. Here, f1 is an effective focal length of the first lens, f6 is an effective focal length of the sixth lens, and f7 is an effective focal length of the seventh lens. The optical imaging system satisfies: $2.5<|f1/f6-f1/f7|<3.5$, which can ensure the shape of the sixth lens and the shape of the seventh lens, thereby being conducive to the molding process of the sixth lens and the seventh lens. In addition, it also helps to correct the off-axis aberration of the optical imaging system and improve the imaging quality. More specifically, f1, f6 and f7 may satisfy: $2.70<|f1/f6-f1/f7|<3.20$.

In exemplary implementations, the optical imaging system according to the present disclosure may satisfy 2.5≤

(R2+R1)/(R2−R1)<3.0. Here, R2 is a radius of curvature of an image-side surface of the first lens, and R1 is a radius of curvature of an object-side surface of the first lens. The optical imaging system satisfies: 2.5≤(R2+R1)/(R2−R1)<3.0, which can ensure that the aperture of the first lens is within a certain range, so that the optical imaging system has the characteristics of large aperture. More specifically, R2 and R1 may satisfy: 2.50≤(R2+R1)/(R2−R1)<2.70.

In exemplary implementations, the optical imaging system according to the present disclosure may satisfy 3.0<R7/f+R8/f<8.0. Here, R7 is a radius of curvature of an object-side surface of the fourth lens, f is the total effective focal length of the optical imaging system, and R8 is a radius of curvature of an image-side surface of the fourth lens. The optical imaging system satisfies: 3.0<R7/f+R8/f<8.0, which is conducive to the molding process of the fourth lens and reducing the aberration of the optical imaging system. More specifically, R7, f and R8 may satisfy: 3.20<R7/f+R8/f<7.60.

In exemplary implementations, the optical imaging system according to the present disclosure may satisfy −3.5<R13/R14<−2.5. Here, R13 is a radius of curvature of an object-side surface of the seventh lens, and R14 is a radius of curvature of an image-side surface of the seventh lens. The optical imaging system satisfies: −3.5<R13/R14<−2.5, which can ensure the shape of the seventh lens, thereby being conducive to the molding process of the seventh lens. More specifically, R13 and R14 may satisfy: −3.20<R13/R14<−2.70.

In exemplary implementations, the optical imaging system according to the present disclosure may satisfy 2.5<T67/T45<3.5. Here, T67 is a spacing distance between the sixth lens and the seventh lens on the optical axis, and T45 is a spacing distance between the fourth lens and the fifth lens on the optical axis. The optical imaging system satisfies: 2.5<T67/T45<3.5, which can make the optical imaging system has the characteristics of being light and thin. More specifically, T67 and T45 may satisfy: 2.50<T67/T45<3.10.

In exemplary implementations, the optical imaging system according to the present disclosure may satisfy 2.0<CT1/CT6+CT1/CT7<2.5. Here, CT1 is a center thickness of the first lens on the optical axis, CT6 is a center thickness of the sixth lens on the optical axis, and CT7 is a center thickness of the seventh lens on the optical axis. The optical imaging system satisfies: 2.0<CT1/CT6+CT1/CT7<2.5, which can make the optical imaging system has the characteristics of being light and thin. More specifically, CT1, CT6 and CT7 may satisfy: 2.10<CT1/CT6+CT1/CT7<2.40.

In exemplary implementations, the optical imaging system according to the present disclosure may satisfy ImgH≥5.0 mm. Here, ImgH is half of a diagonal length of an effective pixel area on the image plane of the optical imaging system. The optical imaging system satisfies: ImgH≥5.0 mm, which can make the optical imaging system has the characteristics of high pixel. More specifically, ImgH may satisfy: ImgH≥5.30 mm.

In exemplary implementations, the optical imaging system according to the present disclosure may satisfy 1.0<ΣAT/tan(Semi-FOV)<3.0. Here, ΣAT is a sum of spacing distances between any two adjacent lenses in the first to seventh lenses on the optical axis, and Semi-FOV is half of the maximal field-of-view of the optical imaging system. The optical imaging system satisfies: 1.0<ΣAT/tan(Semi-FOV)<3.0, which can ensure that the optical imaging system has a large imaging range and a small size. More specifically, ΣAT and Semi-FOV may satisfy: 2.00<ΣAT/tan(Semi-FOV)<2.50.

In exemplary implementations, the optical imaging system according to the present disclosure may satisfy TTL/ImgH<1.2. Here, TTL is a distance from the object-side surface of the first lens to the image plane of the optical imaging system on the optical axis, and ImgH is half of the diagonal length of the effective pixel area on the image plane of the optical imaging system. The optical imaging system satisfies: TTL/ImgH<1.2, which can ensure that the optical imaging system has a large imaging range and a small size. More specifically, TTL and ImgH may satisfy: TTL/ImgH<1.10.

In exemplary implementations, the above optical imaging system may further include an optical filter for correcting color deviations and/or a protective glass for protecting a photosensitive element on the image plane.

The optical imaging system according to the above implementations of the present disclosure may use a plurality of lenses, for example, the seven lenses as described above. By reasonably distributing the refractive powers and the surface types of the lenses, the center thicknesses of the lenses, the axial spacing distances between the lenses, etc., it is possible to effectively reduce the volume of the optical imaging system, reduce the sensitivity of the optical imaging system and improve the processability of the optical imaging system, so that the optical imaging system is more conducive to production and processing and can be applied to portable electronic products. The optical imaging system according to the implementations of the present disclosure further has the characteristics of high resolution, high pixel, light and thin, and good temperature performance.

In implementations of the present disclosure, at least one of the surfaces of the lenses is an aspheric surface. That is, at least one of the surfaces from the object-side surface of the first lens to the image-side surface of the seventh lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens and the seventh lens is an aspheric surface. Alternatively, the object-side surface and the image-side surface of each of the first lens, the second lens, the third lens, the fourth lens, the fifth lens, the sixth lens and the seventh lens are aspheric surfaces.

However, it should be understood by those skilled in the art that the various results and advantages described in the present specification may be obtained by changing the number of the lenses constituting the optical imaging system without departing from the technical solution claimed by the present disclosure. For example, although the optical imaging system having seven lenses is described as an example in the implementations, the optical imaging system is not limited to having the seven lenses. If desired, the optical imaging system may also include other numbers of lenses.

Specific embodiments of the optical imaging system that may be applied to the above implementations are further described below with reference to the accompanying drawings.

Embodiment 1

An optical imaging system according to Embodiment 1 of the present disclosure is described below with reference to FIGS. 1 to 2C. FIG. 1 is a schematic structural diagram of the optical imaging system according to Embodiment 1 of the present disclosure.

As shown in FIG. 1, the optical imaging system includes, sequentially along an optical axis from an object side to an image side: a stop STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. The optical imaging system has an image plane S17, light from an object sequentially passes through the surfaces S1 to S16 and finally forms an image on the image plane S17.

Table 1 is a table showing basic parameters of the optical imaging system in Embodiment 1. Here, the units of a radius of curvature, a thickness and a focal length are millimeters (mm).

TABLE 1

| surface number | surface type | radius of curvature | thickness | refractive index | abbe number | focal length | conic coefficient |
|---|---|---|---|---|---|---|---|
| OBJ | spherical | infinite | infinite | | | | |
| STO | spherical | infinite | −0.4967 | | | | |
| S1 | aspheric | 1.9730 | 0.5810 | 1.59 | 61.2 | 5.55 | 0.2346 |
| S2 | aspheric | 4.4160 | 0.0678 | | | | 1.3507 |
| S3 | aspheric | 5.0634 | 0.2000 | 1.68 | 19.2 | −21.80 | 8.3717 |
| S4 | aspheric | 3.7100 | 0.3119 | | | | 6.9374 |
| S5 | aspheric | 460.1459 | 0.3032 | 1.54 | 55.7 | 45.70 | −90.0000 |
| S6 | aspheric | −25.8967 | 0.1613 | | | | −90.0000 |
| S7 | aspheric | 21.2277 | 0.2046 | 1.68 | 19.2 | −94.01 | −89.2495 |
| S8 | aspheric | 15.8559 | 0.4821 | | | | −81.8514 |
| S9 | aspheric | 21.9529 | 0.2700 | 1.54 | 55.7 | −21.24 | −7.2915 |
| S10 | aspheric | 7.4703 | 0.2664 | | | | 0.0000 |
| S11 | aspheric | 4.8542 | 0.4548 | 1.54 | 55.7 | 4.50 | 0.0000 |
| S12 | aspheric | −4.6399 | 1.2243 | | | | −0.2691 |
| S13 | aspheric | −7.2964 | 0.5451 | 1.54 | 55.7 | −3.35 | 1.5126 |
| S14 | aspheric | 2.4424 | 0.3036 | | | | −0.7267 |
| S15 | spherical | infinite | 0.2155 | 1.52 | 64.2 | | |
| S16 | spherical | infinite | 0.2085 | | | | |
| S17 | spherical | infinite | | | | | |

In Embodiment 1, a total effective focal length f of the optical imaging system is 4.89 mm. A distance TTL from the object-side surface S1 of the first lens E1 to the image plane S17 on the optical axis is 5.80 mm. Half of a maximal field-of-view Semi-FOV of the optical imaging system is 47.4°. Half of a diagonal length ImgH of an effective pixel area on the image plane S17 is 5.50 mm.

In Embodiment 1, both the object-side surface and the image-side surface of any lens in the first to seventh lenses E1 to E7 are aspheric surfaces, and the surface type x of an aspheric lens may be defined using, but not limited to, the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 2 below shows the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1 to S14 in Embodiment 1.

TABLE 2

| Surface number | $A_4$ | $A_6$ | $A_8$ | $A_{10}$ | $A_{12}$ | $A_{14}$ | $A_{16}$ |
|---|---|---|---|---|---|---|---|
| S1  | 1.6375E−02 | 4.8178E−03 | 1.2690E−03 | 3.6495E−04 | 6.3421E−05 | 0.0000E+00 | 0.0000E+00 |
| S2  | −1.5070E−02 | 8.8351E−03 | −3.3843E−04 | −6.2699E−04 | −3.5669E−04 | −7.7372E−05 | 9.5796E−06 |
| S3  | −2.1337E−02 | 9.2275E−03 | −1.9621E−03 | −8.7385E−04 | −4.1904E−04 | −8.4481E−05 | −9.7474E−06 |
| S4  | 1.8804E−02 | 8.0545E−03 | 1.2775E−04 | −5.5477E−06 | −8.7854E−05 | −1.4260E−05 | 1.3431E−05 |
| S5  | −3.7044E−03 | 5.8629E−03 | 2.9473E−03 | 8.1004E−04 | 1.6456E−04 | −3.7773E−05 | 2.2005E−05 |
| S6  | −6.8155E−02 | 2.7449E−03 | 4.5478E−03 | 1.5430E−03 | −1.6571E−04 | −7.5806E−04 | −4.0673E−04 |
| S7  | −2.7795E−01 | −6.0701E−03 | 8.3926E−03 | 3.4138E−03 | 2.6608E−04 | −1.2117E−03 | −9.3705E−04 |
| S8  | −2.9333E−01 | 1.2131E−02 | 1.5125E−02 | 4.4806E−03 | 2.4364E−04 | −7.6477E−04 | −3.6163E−04 |
| S9  | −4.3164E−01 | 7.7510E−02 | −1.4942E−02 | 1.0001E−02 | −2.5275E−03 | 0.0000E+00 | 0.0000E+00 |
| S10 | −9.3552E−01 | 2.4523E−01 | −6.0321E−02 | 3.313E−03 | 3.0229E−03 | 4.8065E−05 | 0.0000E+00 |
| S11 | −1.2023E+00 | −6.0828E−02 | 7.2101E−02 | 9.9109E−03 | 6.1669E−03 | −1.3282E−03 | −8.6736E−04 |
| S12 | 4.8285E−01 | −2.3911E−01 | 9.9006E−02 | −2.6298E−02 | 9.6787E−03 | 4.3334E−03 | −7.6254E−04 |
| S13 | −3.1347E−02 | 7.7973E−01 | −4.3923E−01 | 2.3034E−01 | −8.4445E−02 | 2.2790E−02 | −1.9512E−03 |
| S14 | −7.8190E+00 | 8.6988E−01 | −4.0378E−01 | 1.6360E−01 | −8.8507E−02 | 2.9122E−02 | −1.7043E−02 |

| Surface number | $A_{18}$ | $A_{20}$ | $A_{22}$ | $A_{24}$ | $A_{26}$ | $A_{28}$ | $A_{30}$ |
|---|---|---|---|---|---|---|---|
| S1  | 0.0000E+00 | 0.0000E+00 | 0.0000E+00 | 0.0000E+00 | 0.0000E+00 | 0.0000E+00 | 0.0000E+00 |
| S2  | 3.1818E−05 | 1.8072E−05 | 5.4460E−06 | 4.6520E−07 | 6.2752E−06 | 9.9869E−06 | 8.3115E−06 |
| S3  | 1.1922E−05 | −1.0191E−06 | −5.5027E−06 | −4.6772E−06 | 4.6580E−06 | 9.4072E−06 | 1.0737E−05 |
| S4  | 1.6325E−05 | 1.4012E−05 | 0.0000E+00 | 0.0000E+00 | 0.0000E+00 | 0.0000E+00 | 0.0000E+00 |
| S5  | 2.2527E−05 | 4.3732E−05 | 5.9769E−06 | 3.2427E−06 | −9.1104E−06 | −2.5001E−06 | −9.1695E−06 |
| S6  | −1.4702E−04 | 7.9061E−05 | 7.5887E−05 | 6.2717E−05 | 5.1465E−06 | −6.8229E−06 | −1.3271E−05 |
| S7  | −5.4956E−04 | −1.3160E−04 | −1.6455E−05 | 4.4370E−05 | 1.7737E−05 | 1.4034E−05 | 3.4664E−06 |
| S8  | −6.5567E−05 | 9.1990E−05 | 5.7852E−05 | 2.6736E−05 | −5.9572E−06 | −6.6977E−06 | −8.3442E−07 |
| S9  | 0.0000E+00 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 | 0.0000E+00 |
| S11 | −6.9680E−04 | −2.5577E−04 | 2.8300E−05 | 4.0569E−04 | 7.5974E−05 | −8.1383E−05 | −5.8583E−05 |
| S12 | 5.7661E−04 | −4.4534E−04 | 1.9226E−04 | 1.0182E−04 | −2.4160E−04 | 8.6849E−05 | 5.4348E−05 |
| S13 | 2.8110E−04 | −2.2096E−03 | 2.3131E−03 | −1.6618E−03 | 7.8766E−04 | −1.9549E−04 | −7.6804E−06 |
| S14 | 1.1802E−02 | −5.6539E−03 | 2.8531E−03 | −2.1446E−03 | 1.7765E−03 | −1.1382E−03 | −3.5086E−04 |

Figures 2A, 2B:
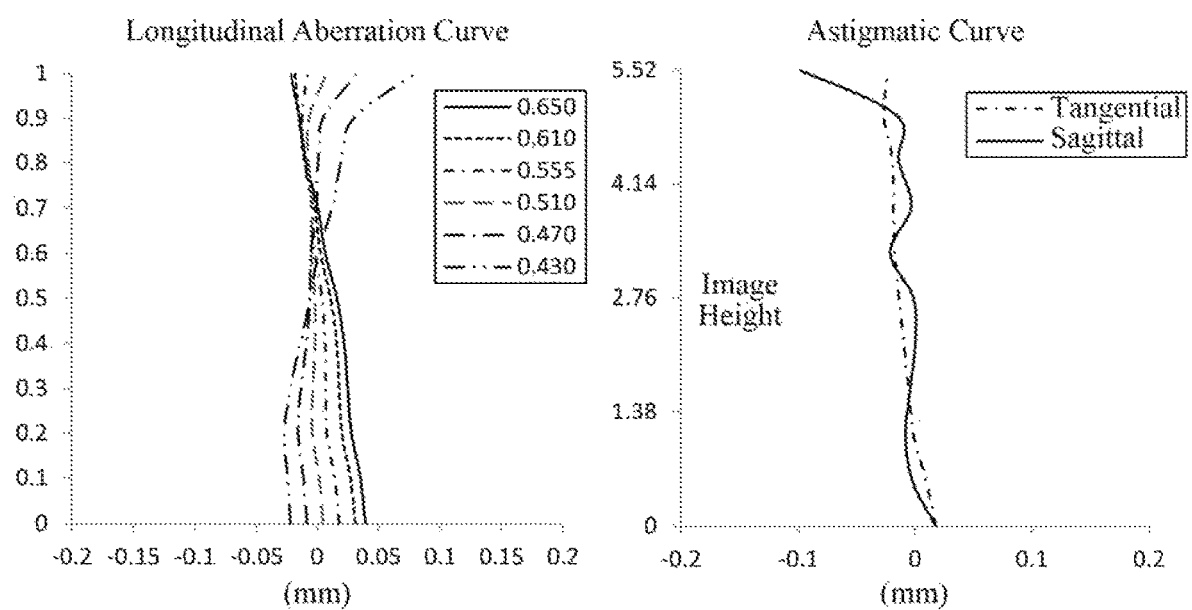
FIGS. 2A to 2C respectively show a longitudinal aberration curve, an astigmatic curve and a distortion curve of the optical imaging system according to Embodiment 1.
Figure 2C:
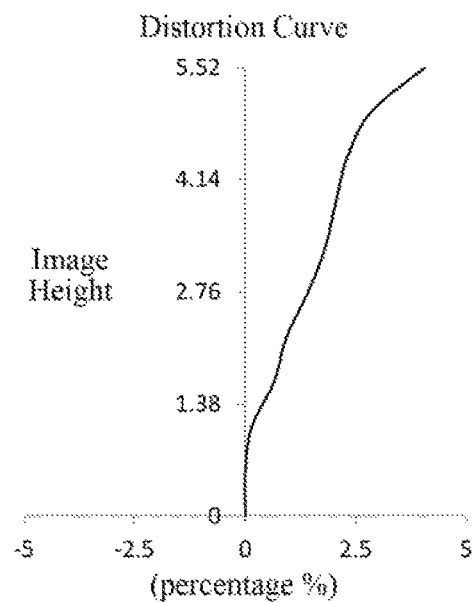

FIG. 2A illustrates a longitudinal aberration curve of the optical imaging system according to Embodiment 1, representing deviations of focal points of light of different wavelengths converged after passing through the system. FIG. 2B illustrates an astigmatic curve of the optical imaging system according to Embodiment 1, representing a curvature of a tangential image plane and a curvature of a sagittal image plane. FIG. 2C illustrates a distortion curve of the optical imaging system according to Embodiment 1, representing amounts of distortion corresponding to different image heights. It can be seen from FIGS. 2A to 2C that the optical imaging system given in Embodiment 1 can achieve a good imaging quality.

Embodiment 2

Figure 3:
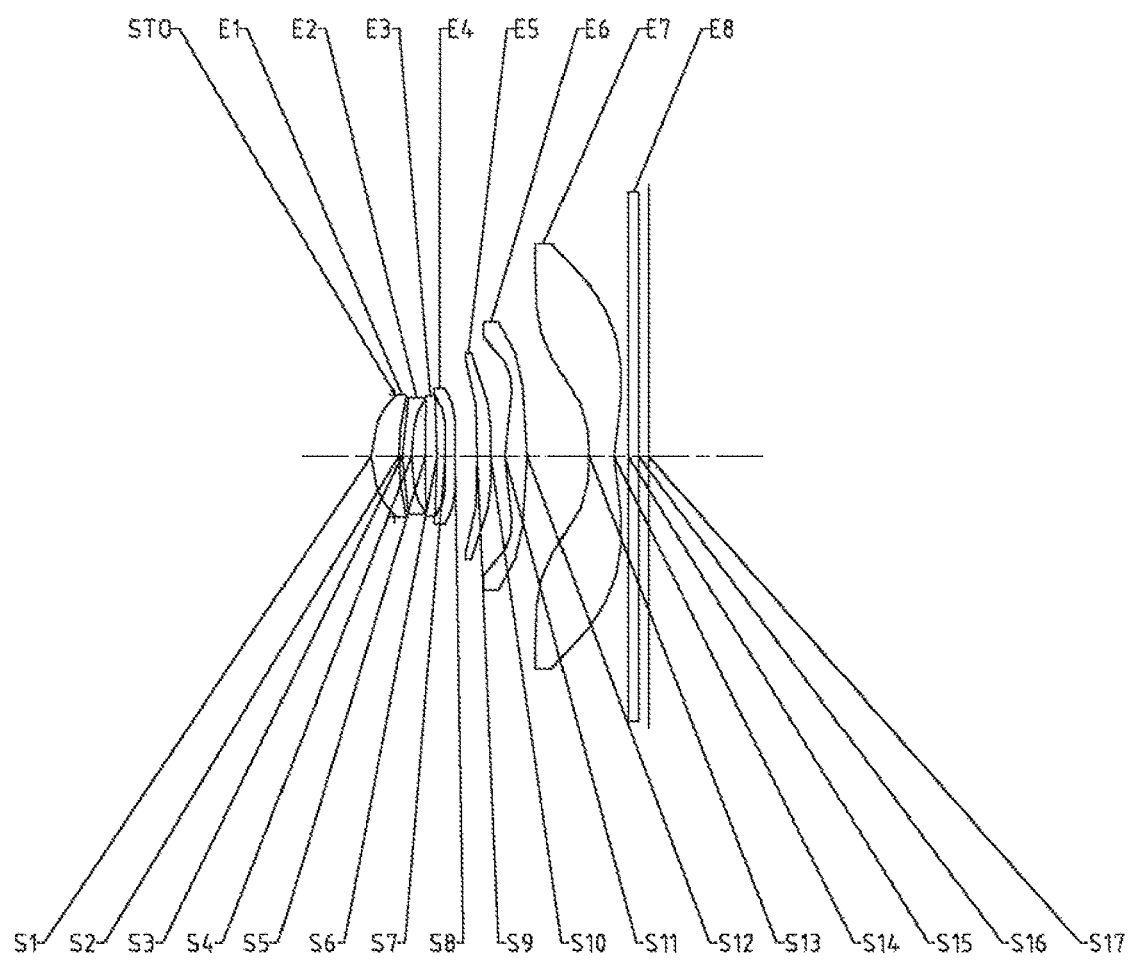
FIG. 3 is a schematic structural diagram of an optical imaging system according to Embodiment 2 of the present disclosure.

An optical imaging system according to Embodiment 2 of the present disclosure is described below with reference to FIGS. 3 to 4C. In this embodiment and the following embodiments, for the sake of brevity, some descriptions similar to those in Embodiment 1 will be omitted. FIG. 3 is a schematic structural diagram of the optical imaging system according to Embodiment 2 of the present disclosure.

As shown in FIG. 3, the optical imaging system includes, sequentially along an optical axis from an object side to an image side: a stop STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. The optical imaging system has an image plane S17, light from an object sequentially passes through the surfaces S1 to S16 and finally forms an image on the image plane S17.

In Embodiment 2, a total effective focal length f of the optical imaging system is 4.93 mm. A distance TTL from the object-side surface S1 of the first lens E1 to the image plane S17 on the optical axis is 5.86 mm. Half of a maximal field-of-view Semi-FOV of the optical imaging system is 47.4°. Half of a diagonal length ImgH of an effective pixel area on the image plane S17 is 5.78 mm.

Table 3 is a table showing basic parameters of the optical imaging system in Embodiment 2. Here, the units of a radius of curvature, a thickness and a focal length are millimeters (mm). Table 4 shows the high-order coefficients applicable to the aspheric surfaces in Embodiment 2. Here, the surface type of each aspheric surface may be defined using the formula (1) given in Embodiment 1.

TABLE 3

| surface number | surface type | radius of curvature | thickness | material refractive index | abbe number | focal length | conic coefficient |
|---|---|---|---|---|---|---|---|
| OBJ | spherical | infinite | infinite | | | | |
| STO | spherical | infinite | −0.4947 | | | | |
| S1 | aspheric | 2.0193 | 0.5860 | 1.59 | 61.2 | 5.54 | 0.2447 |
| S2 | aspheric | 4.7030 | 0.0733 | | | | 0.9645 |
| S3 | aspheric | 5.6682 | 0.2000 | 1.68 | 19.2 | −18.99 | 8.4298 |
| S4 | aspheric | 3.8778 | 0.2898 | | | | 6.9004 |
| S5 | aspheric | 88.5242 | 0.2503 | 1.54 | 55.7 | 82.70 | −89.3783 |
| S6 | aspheric | −88.8877 | 0.1778 | | | | −90.0000 |
| S7 | aspheric | 11.0645 | 0.2024 | 1.68 | 19.2 | −100.00 | −87.4907 |
| S8 | aspheric | 9.4399 | 0.4687 | | | | −90.0000 |
| S9 | aspheric | 15.0736 | 0.2849 | 1.54 | 55.7 | −31.44 | −27.7464 |
| S10 | aspheric | 7.9080 | 0.3047 | | | | 0.0000 |
| S11 | aspheric | 4.8716 | 0.4694 | 1.54 | 55.7 | 4.56 | 0.0000 |
| S12 | aspheric | −4.7604 | 1.3049 | | | | −0.2316 |
| S13 | aspheric | −7.3266 | 0.5244 | 1.54 | 55.7 | −3.34 | 1.5119 |
| S14 | aspheric | 2.4350 | 0.3034 | | | | −0.7267 |
| S15 | spherical | infinite | 0.2155 | 1.52 | 64.2 | | |
| S16 | spherical | infinite | 0.2083 | | | | |
| S17 | spherical | infinite | | | | | |

TABLE 4

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.8516E−02 | 5.2252E−03 | 1.3424E−03 | 3.6429E−04 | 8.3404E−05 | 0.0000E+00 | 0.0000E+00 |
| S2 | −1.6402E−02 | 9.4566E−03 | −7.7845E−04 | −7.5651E−04 | −6.1446E−04 | −3.0930E−04 | −1.2422E−04 |
| S3 | −2.2228E−02 | 1.1247E−02 | −2.4057E−03 | −9.3425E−04 | −6.9903E−04 | −3.2426E−04 | −1.1095E−04 |
| S4 | 1.5385E−02 | 1.0116E−02 | 4.5828E−04 | 3.1293E−04 | −1.1559E−04 | −6.7668E−05 | −2.3651E−05 |
| S5 | −6.6396E−03 | 5.3697E−03 | 1.7659E−03 | 5.3468E−04 | −3.6398E−05 | −4.8355E−05 | −1.2562E−05 |
| S6 | −4.3346E−02 | 9.8638E−03 | 2.8710E−03 | 5.1903E−04 | −8.4118E−04 | −7.2898E−04 | −3.3899E−04 |
| S7 | −2.7867E−01 | 2.8275E−04 | 8.0091E−03 | 3.8817E−03 | 3.8097E−04 | −9.4456E−04 | −8.2539E−04 |
| S8 | −3.0996E−01 | 7.9695E−03 | 1.3223E−02 | 6.1353E−03 | 1.4054E−03 | −1.3843E−04 | −2.5092E−04 |
| S9 | −4.4565E−01 | 8.0076E−02 | −1.4374E−02 | 9.6430E−03 | −2.3528E−03 | 0.0000E+00 | 0.0000E+00 |
| S10 | −8.8052E−01 | 2.2361E−01 | −4.9385E−02 | 9.6529E−04 | 2.0649E−03 | 3.1261E−05 | 0.0000E+00 |
| S11 | −1.1579E+00 | −6.8111E−02 | 6.4532E−02 | 8.2259E−03 | 6.0560E−03 | −7.9282E−04 | −5.4665E−04 |
| S12 | 4.7670E−01 | −2.3818E−01 | 9.0118E−02 | −2.3299E−02 | 7.8925E−03 | 3.9348E−03 | −3.9360E−04 |
| S13 | 2.0915E−01 | 7.7468E−01 | −4.5658E−01 | 2.6852E−01 | −1.0121E−01 | 3.3969E−02 | −5.2791E−03 |
| S14 | −8.5532E+00 | 8.8582E−01 | −5.6336E−01 | 1.3988E−01 | −9.9851E−02 | 3.9797E−02 | −2.1284E−02 |

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | −3.1660E−05 | −1.2962E−05 | −1.2748E−05 | −1.5358E−05 | −1.1756E−05 | −3.9483E−06 | 8.7934E−07 |
| S3 | −4.1271E−05 | −1.5770E−05 | −1.4599E−05 | −9.5021E−06 | −6.5501E−06 | −3.9593E−06 | −3.6767E−06 |
| S4 | −1.0374E−05 | −7.0952E−06 | 0.0000E+00 | 0.0000E+00 | 0.0000E+00 | 0.0000E+00 | 0.0000E+00 |
| S5 | 2.7124E−05 | 2.4432E−05 | 1.1211E−05 | 1.9513E−06 | −2.3737E−06 | −1.4707E−06 | −1.6568E−06 |
| S6 | −5.7044E−05 | 5.1128E−05 | 3.9513E−05 | 1.9062E−05 | −2.3126E−06 | −3.6326E−06 | −4.6255E−06 |
| S7 | −4.9391E−04 | −1.3613E−04 | −3.9669E−05 | 2.0479E−05 | 2.3169E−05 | 7.7575E−06 | −1.8482E−06 |
| S8 | −1.1140E−04 | 5.1745E−05 | 3.5900E−05 | 3.0959E−05 | −9.0581E−06 | −4.7936E−06 | −1.1038E−05 |
| S9 | 0.0000E+00 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 | 0.0000E+00 |
| S11 | −5.8746E−04 | −3.2376E−04 | −1.2060E−04 | 3.2579E−04 | 1.0873E−04 | −3.6979E−05 | −4.3729E−05 |
| S12 | 8.5637E−04 | −3.0582E−04 | 8.7729E−05 | 1.3592E−04 | −1.9695E−04 | 6.3661E−05 | 5.1092E−05 |
| S13 | −9.7560E−04 | −1.9911E−03 | 3.1889E−03 | −2.2418E−03 | 1.1726E−03 | −4.6704E−04 | 1.2581E−04 |
| S14 | 9.6311E−03 | −1.2598E−02 | −1.2039E−04 | −4.7461E−03 | 1.0862E−03 | −1.1055E−03 | 4.4498E−04 |

Figures 4A, 4B:
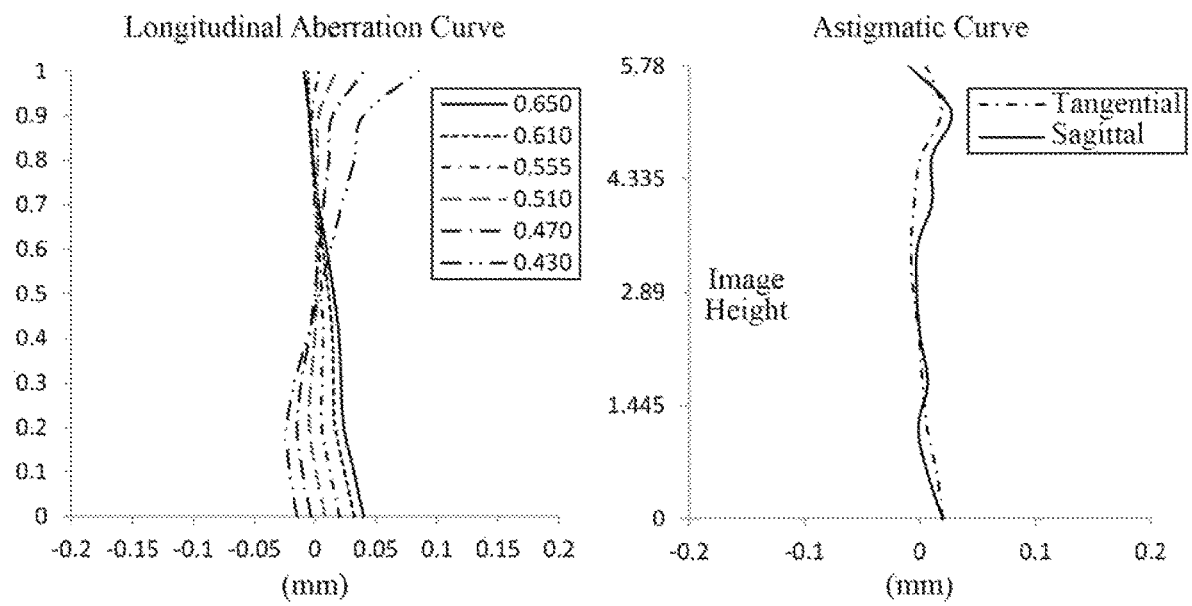
FIGS. 4A to 4C respectively show a longitudinal aberration curve, an astigmatic curve and a distortion curve of the optical imaging system according to Embodiment 2.
Figure 4C:
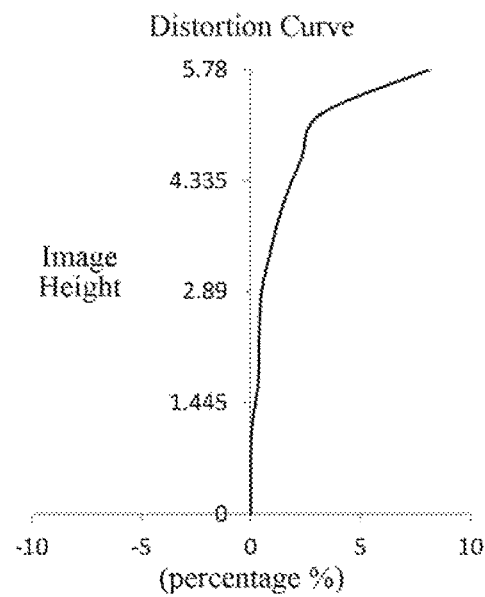

FIG. 4A illustrates a longitudinal aberration curve of the optical imaging system according to Embodiment 2, representing deviations of focal points of light of different wavelengths converged after passing through the system. FIG. 4B illustrates an astigmatic curve of the optical imaging system according to Embodiment 2, representing a curvature of a tangential image plane and a curvature of a sagittal image plane. FIG. 4C illustrates a distortion curve of the optical imaging system according to Embodiment 2, representing amounts of distortion corresponding to different image heights. It can be seen from FIGS. 4A to 4C that the optical imaging system given in Embodiment 2 can achieve a good imaging quality.

Embodiment 3

Figure 5:
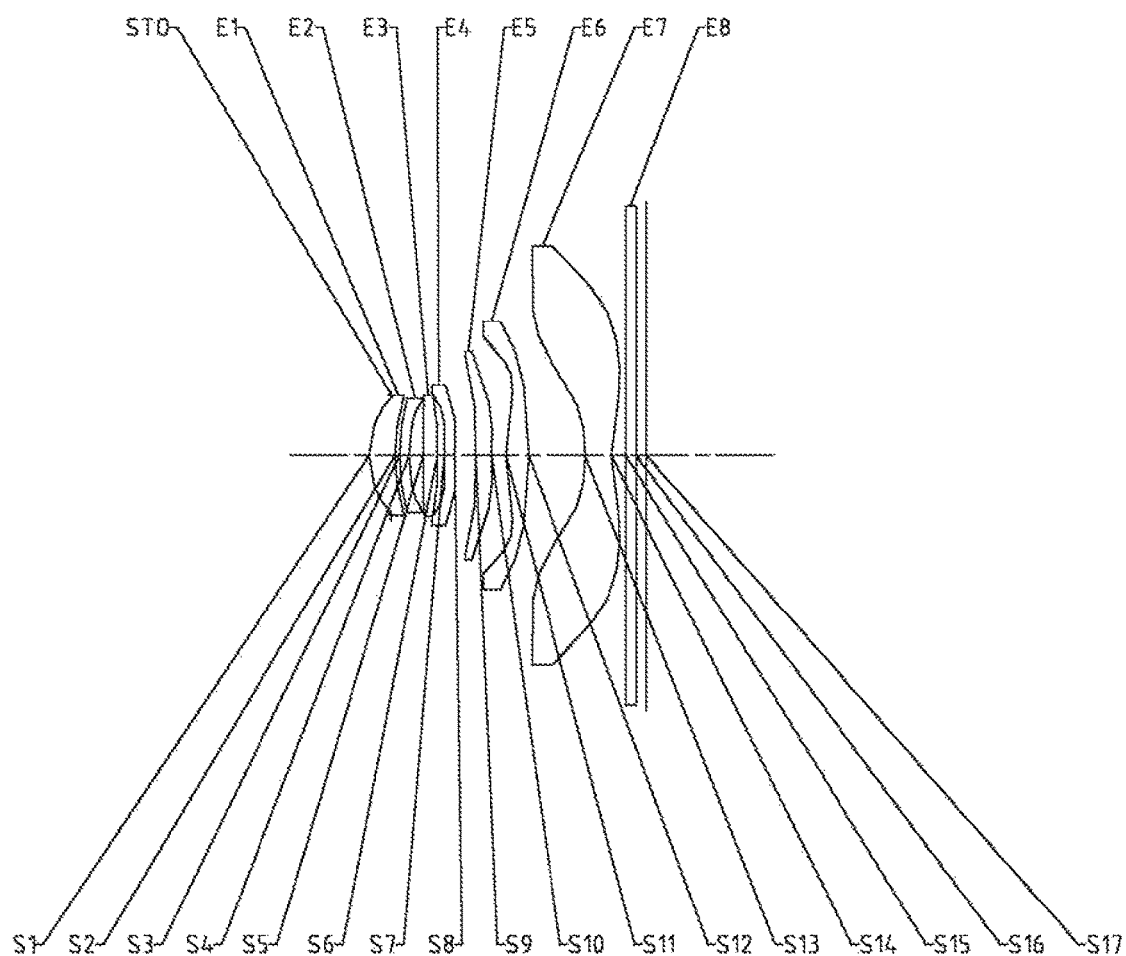
FIG. 5 is a schematic structural diagram of an optical imaging system according to Embodiment 3 of the present disclosure.

An optical imaging system according to Embodiment 3 of the present disclosure is described below with reference to FIGS. 5 to 6C. FIG. 5 is a schematic structural diagram of the optical imaging system according to Embodiment 3 of the present disclosure.

As shown in FIG. 5, the optical imaging system includes, sequentially along an optical axis from an object side to an image side: a stop STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. The optical imaging system has an image plane S17, light from an object sequentially passes through the surfaces S1 to S16 and finally forms an image on the image plane S17.

In Embodiment 3, a total effective focal length f of the optical imaging system is 4.80 mm. A distance TTL from the object-side surface S1 of the first lens E1 to the image plane S17 on the optical axis is 5.87 mm. Half of a maximal field-of-view Semi-FOV of the optical imaging system is 47.4°. Half of a diagonal length ImgH of an effective pixel area on the image plane S17 is 5.39 mm.

Table 5 is a table showing basic parameters of the optical imaging system in Embodiment 3. Here, the units of a radius of curvature, a thickness and a focal length are millimeters (mm). Table 6 shows the high-order coefficients applicable to the aspheric surfaces in Embodiment 3. Here, the surface type of each aspheric surface may be defined using the formula (1) given in Embodiment 1.

TABLE 5

| surface number | surface type | radius of curvature | thickness | material refractive index | abbe number | focal length | conic coefficient |
|---|---|---|---|---|---|---|---|
| OBJ | spherical | infinite | infinite | | | | |
| STO | spherical | infinite | −0.4669 | | | | |
| S1 | aspheric | 1.9914 | 0.5511 | 1.59 | 61.2 | 5.71 | 0.2427 |
| S2 | aspheric | 4.3629 | 0.0983 | | | | 2.0975 |
| S3 | aspheric | 5.0522 | 0.2000 | 1.68 | 19.2 | −23.22 | 8.3917 |
| S4 | aspheric | 3.7621 | 0.2936 | | | | 6.9120 |
| S5 | aspheric | 151.0559 | 0.3015 | 1.54 | 55.7 | 47.71 | −90.0000 |
| S6 | aspheric | −30.7997 | 0.1479 | | | | 90.0000 |
| S7 | aspheric | 13.1372 | 0.2170 | 1.68 | 19.2 | −78.70 | −90.0000 |
| S8 | aspheric | 10.4683 | 0.4469 | | | | −90.0000 |
| S9 | aspheric | 20.4746 | 0.3340 | 1.54 | 55.7 | −25.99 | 41.5936 |
| S10 | aspheric | 8.2476 | 0.3047 | | | | 0.0000 |
| S11 | aspheric | 4.8299 | 0.4840 | 1.54 | 55.7 | 4.40 | 0.0000 |
| S12 | aspheric | −4.4635 | 1.1995 | | | | −0.4096 |
| S13 | aspheric | −7.3509 | 0.5577 | 1.54 | 55.7 | −3.35 | 1.5226 |
| S14 | aspheric | 2.4389 | 0.3085 | | | | −0.7268 |
| S15 | spherical | infinite | 0.2155 | 1.52 | 64.2 | | |
| S16 | spherical | infinite | 0.2134 | | | | |
| S17 | spherical | infinite | | | | | |

TABLE 6

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.4997E−02 | 4.0304E−03 | 1.0153E−03 | 2.4794E−04 | 4.8592E−05 | 0.0000E+00 | 0.0000E+00 |
| S2 | −1.1896E−02 | 6.6806E−03 | 1.5513E−04 | −3.0557E−04 | −1.7802E−04 | −7.9851E−05 | −1.4498E−05 |
| S3 | −2.0877E−02 | 9.0734E−03 | −1.3874E−03 | −5.4417E−04 | −2.7820E−04 | −8.4234E−05 | −2.8923E−05 |
| S4 | 1.2571E−02 | 9.5298E−03 | 2.2672E−03 | 4.4684E−05 | −7.6338E−05 | −3.5914E−05 | −4.2031E−06 |
| S5 | −5.3264E−03 | 6.0689E−03 | 2.5185E−03 | 8.2965E−04 | 1.0773E−04 | −8.9188E−07 | 4.4971E−06 |
| S6 | −7.5238E−02 | 5.3930E−03 | 4.6138E−03 | 1.4486E−03 | −5.7306E−04 | −9.9120E−04 | −5.4707E−04 |
| S7 | −2.9362E−01 | −2.0232E−03 | 8.4171E−03 | 3.7446E−03 | −2.2044E−05 | −1.2862E−03 | −1.0680E−03 |
| S8 | −2.9786E−01 | 1.5037E−02 | 1.4469E−02 | 4.5224E−03 | 2.8200E−04 | −5.6483E−04 | −2.3975E−04 |
| S9 | −4.0228E−01 | 7.5606E−02 | −1.7331E−02 | 9.4308E−03 | −2.4047E−03 | 0.0000E+00 | 0.0000E+00 |
| S10 | −8.8543E−01 | 2.2555E−01 | −5.0341E−02 | 1.1258E−03 | 2.1377E−03 | 3.2509E−05 | 0.0000E+00 |
| S11 | −1.1744E+00 | −6.5586E−02 | 6.7260E−02 | 8.8500E−03 | 6.1181E−03 | −9.7598E−04 | −6.6387E−04 |
| S12 | 4.9592E−01 | −2.1125E−01 | 9.3314E−02 | −2.7333E−02 | 8.7498E−03 | 3.5026E−03 | −1.1938E−03 |

TABLE 6-continued

| | | | | | | |
|---|---|---|---|---|---|---|
| S13 | −2.5902E−02 | 7.8291E−01 | −4.3544E−01 | 2.2112E−01 | −8.1588E−02 | 1.8979E−02 | −1.0102E−03 |
| S14 | −7.8903E+00 | 8.6085E−01 | −4.1349E−01 | 1.6469E−01 | −9.7681E−02 | 2.1605E−02 | −2.1157E−02 |

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | −2.0419E−06 | 4.3865E−06 | −1.5601E−06 | 1.2321E−06 | −1.9871E−07 | 5.1182E−06 | 1.5999E−06 |
| S3 | 4.3315E−07 | −5.3422E−06 | 6.3522E−07 | −3.0629E−06 | 1.6928E−06 | 2.6779E−07 | 3.9463E−06 |
| S4 | 2.9723E−06 | 1.5459E−06 | 0.0000E+00 | 0.0000E+00 | 0.0000E+00 | 0.0000E+00 | 0.0000E+00 |
| S5 | 3.7364E−05 | 3.0823E−05 | 1.4897E−05 | −4.7957E−07 | −5.1103E−06 | −5.9580E−06 | −3.7614E−06 |
| S6 | −1.6724E−04 | 7.2376E−05 | 8.1785E−05 | 5.8146E−05 | 6.5978E−06 | −2.7043E−06 | −8.4760E−06 |
| S7 | −5.6993E−04 | −1.6437E−04 | −8.7562E−06 | 3.4035E−05 | 2.1703E−05 | 8.2977E−06 | 5.5767E−06 |
| S8 | −1.7219E−05 | 9.9926E−05 | 4.8878E−05 | 2.2991E−05 | −8.2853E−06 | −5.2080E−06 | −4.6550E−06 |
| S9 | 0.0000E+00 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 | 0.0000E+00 |
| S11 | −6.3481E−04 | −3.0670E−04 | −6.8521E−05 | 3.5835E−04 | 1.0101E−04 | −5.1160E−05 | −4.8759E−05 |
| S12 | 4.4764E−04 | −3.1531E−04 | 2.7376E−04 | 1.5249E−04 | −2.5333E−04 | 6.5643E−05 | 5.0122E−05 |
| S13 | 6.9321E−04 | −2.7751E−03 | 2.7745E−03 | −1.8627E−03 | 8.1537E−04 | −2.3001E−04 | 1.2617E−05 |
| S14 | 9.4752E−03 | −6.7349E−03 | 2.8840E−03 | −1.7211E−03 | 1.4810E−03 | −9.5008E−04 | −2.3206E−04 |

Figures 6A, 6B:
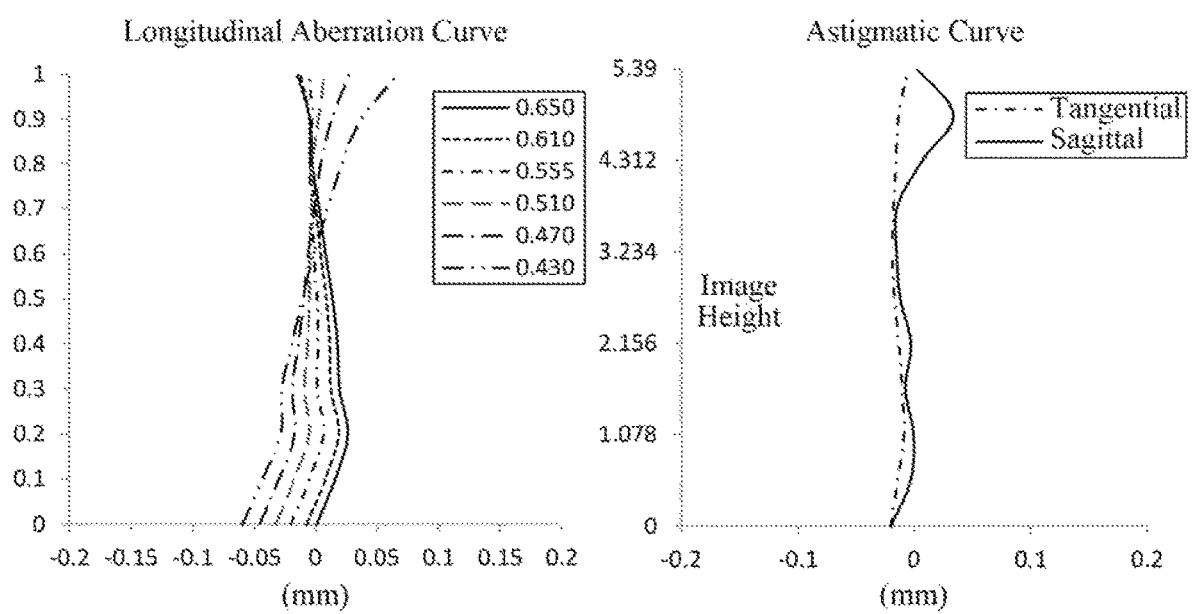
FIGS. 6A to 6C respectively show a longitudinal aberration curve, an astigmatic curve and a distortion curve of the optical imaging system according to Embodiment 3.
Figure 6C:
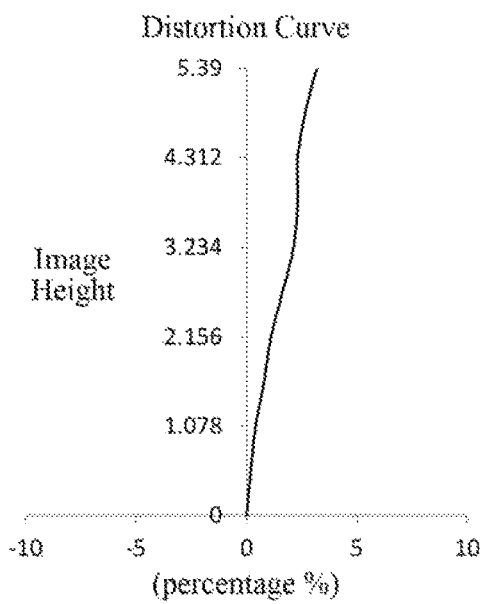

FIG. 6A illustrates a longitudinal aberration curve of the optical imaging system according to Embodiment 3, representing deviations of focal points of light of different wavelengths converged after passing through the system. FIG. 6B illustrates an astigmatic curve of the optical imaging system according to Embodiment 3, representing a curvature of a tangential image plane and a curvature of a sagittal image plane. FIG. 6C illustrates a distortion curve of the optical imaging system according to Embodiment 3, representing amounts of distortion corresponding to different image heights. It can be seen from FIGS. 6A to 6C that the optical imaging system given in Embodiment 3 can achieve a good imaging quality.

Embodiment 4

Figure 7:
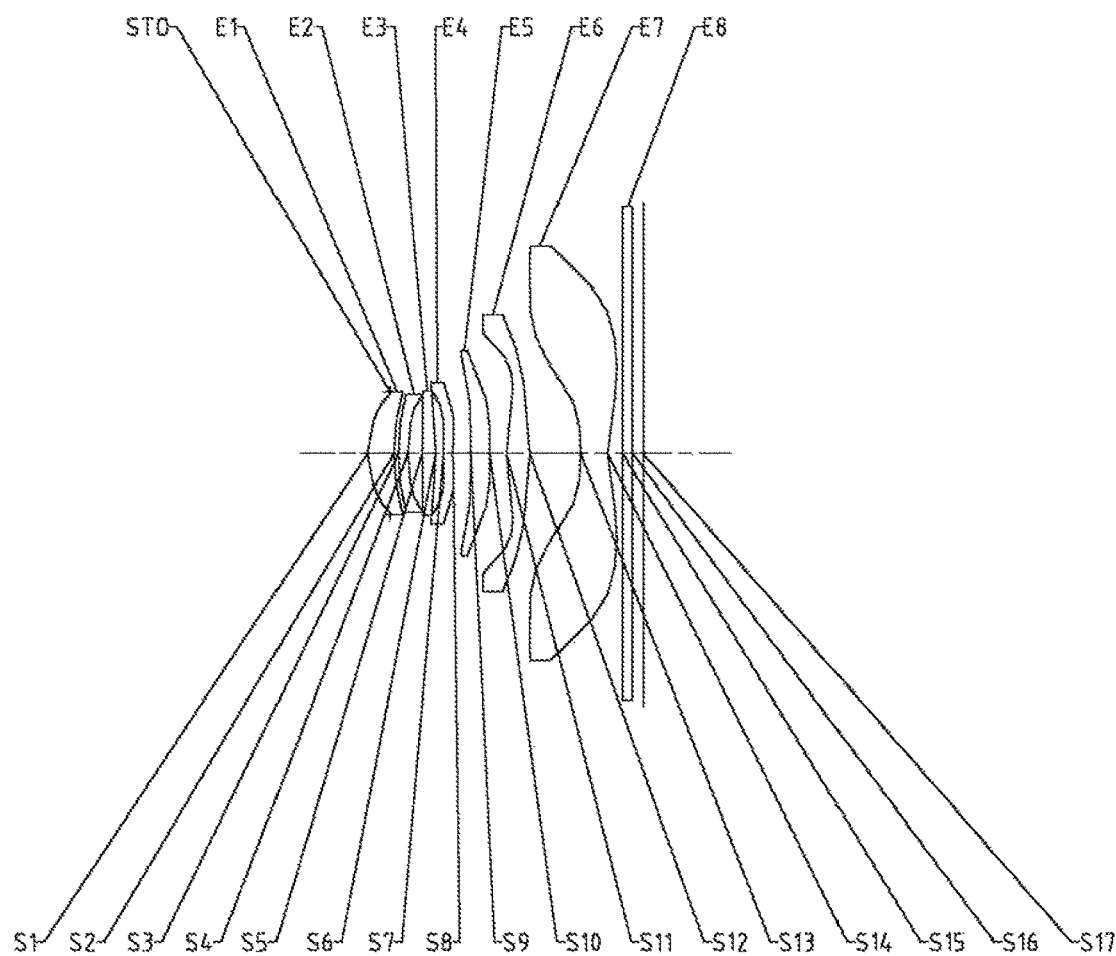
FIG. 7 is a schematic structural diagram of an optical imaging system according to Embodiment 4 of the present disclosure.

An optical imaging system according to Embodiment 4 of the present disclosure is described below with reference to FIGS. 7 to 8C. FIG. 7 is a schematic structural diagram of the optical imaging system according to Embodiment 4 of the present disclosure.

As shown in FIG. 7, the optical imaging system includes, sequentially along an optical axis from an object side to an image side: a stop STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. The optical imaging system has an image plane S17, light from an object sequentially passes through the surfaces S1 to S16 and finally forms an image on the image plane S17.

In Embodiment 4, a total effective focal length f of the optical imaging system is 4.73 mm. A distance TTL from the object-side surface S1 of the first lens E1 to the image plane S17 on the optical axis is 5.88 mm. Half of a maximal field-of-view Semi-FOV of the optical imaging system is 47.4°. Half of a diagonal length ImgH of an effective pixel area on the image plane S17 is 5.35 mm.

Table 7 is a table showing basic parameters of the optical imaging system in Embodiment 4. Here, the units of a radius of curvature, a thickness and a focal length are millimeters (mm). Table 8 shows the high-order coefficients applicable to the aspheric surfaces in Embodiment 4. Here, the surface type of each aspheric surface may be defined using the formula (1) given in Embodiment 1.

TABLE 7

| surface number | surface type | radius of curvature | thickness | material | | focal length | conic coefficient |
| | | | | refractive index | abbe number | | |
|---|---|---|---|---|---|---|---|
| OBJ | spherical | infinite | infinite | | | | |
| STO | spherical | infinite | −0.4819 | | | | |
| S1 | aspheric | 2.0331 | 0.5670 | 1.59 | 61.2 | 5.71 | 0.2357 |
| S2 | aspheric | 4.5891 | 0.0984 | | | | 1.6269 |
| S3 | aspheric | 5.3906 | 0.2000 | 1.68 | 19.2 | −21.84 | 8.4118 |
| S4 | aspheric | 3.8912 | 0.3046 | | | | 6.9041 |

TABLE 7-continued

| surface number | surface type | radius of curvature | thickness | material refractive index | abbe number | focal length | conic coefficient |
|---|---|---|---|---|---|---|---|
| S5 | aspheric | 46.3220 | 0.2871 | 1.54 | 55.7 | 62.11 | −90.0000 |
| S6 | aspheric | −118.5086 | 0.1661 | | | | 90.0000 |
| S7 | aspheric | 9.4442 | 0.2025 | 1.68 | 19.2 | −57.79 | −86.3932 |
| S8 | aspheric | 7.5417 | 0.3817 | | | | −85.8103 |
| S9 | aspheric | 16.3865 | 0.4044 | 1.54 | 55.7 | −100.00 | 31.7296 |
| S10 | aspheric | 12.4447 | 0.3621 | | | | 0.0000 |
| S11 | aspheric | 5.2363 | 0.4928 | 1.54 | 55.7 | 4.41 | −1.0069 |
| S12 | aspheric | −4.1779 | 1.0795 | | | | 1.5307 |
| S13 | aspheric | −7.4380 | 0.5692 | 1.54 | 55.7 | −3.32 | −0.7290 |
| S14 | aspheric | 2.4081 | 0.3256 | | | | |
| S15 | spherical | infinite | 0.2100 | 1.52 | 64.2 | | |
| S16 | spherical | infinite | 0.2305 | | | | |
| S17 | spherical | infinite | | | | | |

TABLE 8

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.5846E−02 | 4.1406E−03 | 1.0018E−03 | 2.5096E−04 | 4.9427E−05 | 0.0000E+00 | 0.0000E+00 |
| S2 | −1.3379E−02 | 7.4520E−03 | −1.7326E−04 | −3.7501E−04 | −2.4214E−04 | −9.9206E−05 | −2.6812E−05 |
| S3 | −2.0791E−02 | 1.0484E−02 | −1.9276E−03 | −6.6424E−04 | −3.4576E−04 | −1.2354E−04 | −3.0812E−05 |
| S4 | 1.4452E−02 | 1.1195E−02 | 3.2421E−04 | 1.6153E−04 | −6.5215E−05 | −3.1157E−05 | 6.9014E−07 |
| S5 | −1.7919E−02 | 5.9685E−03 | 2.6993E−03 | 7.5364E−04 | 1.8805E−05 | −4.5453E−05 | 3.5285E−06 |
| S6 | −8.2422E−02 | 8.9949E−03 | 5.3054E−03 | 1.4564E−03 | −9.5491E−04 | −1.0384E−03 | −5.3260E−04 |
| S7 | −3.1116E−01 | 2.2083E−03 | 9.9656E−03 | 4.7864E−03 | −1.6407E−04 | −1.2958E−03 | −1.0675E−03 |
| S8 | −3.2010E−01 | 1.3934E−02 | 1.3988E−02 | 5.2721E−03 | 1.7373E−04 | −4.8662E−04 | −2.6951E−04 |
| S9 | −4.0918E−01 | 6.9867E−02 | −1.3742E−02 | 8.8432E−03 | −2.4965E−03 | 0.0000E+00 | 0.0000E+00 |
| S10 | −8.2811E−01 | 2.0260E−01 | −3.9608E−02 | −2.9270E−04 | 1.4125E−03 | 2.0350E−05 | 0.0000E+00 |
| S11 | −1.1522E+00 | −6.8929E−02 | 6.3620E−03 | 8.0132E−03 | 6.0296E−03 | −7.3436E−04 | −5.0729E−04 |
| S12 | 5.7975E−01 | −2.0430E−01 | 8.2046E−02 | −2.9288E−02 | 9.4743E−03 | 1.6291E−03 | −1.3647E−03 |
| S13 | 1.3567E−02 | 7.4892E−01 | −4.3151E−01 | 2.2416E−01 | −8.4932E−02 | 1.3656E−02 | 3.5986E−03 |
| S14 | −8.1107E+00 | 7.4546E−01 | −4.1787E−01 | 1.5308E−01 | −9.6583E−02 | 6.5800E−03 | −2.7830E−02 |

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | −5.9052E−07 | 4.3667E−07 | −3.3652E−06 | −3.5910E−06 | −1.9422E−06 | 2.9040E−06 | 3.0658E−06 |
| S3 | −7.0154E−06 | −4.1722E−06 | −2.1862E−06 | −9.0756E−07 | 1.7517E−06 | 1.3167E−06 | 9.7174E−07 |
| S4 | 2.3444E−06 | −1.4056E−06 | 0.0000E+00 | 0.0000E+00 | 0.0000E+00 | 0.0000E+00 | 0.0000E+00 |
| S5 | 4.1298E−05 | 3.6320E−05 | 1.5288E−05 | 1.6160E−06 | −3.1121E−06 | −3.3261E−06 | −3.3205E−06 |
| S6 | −9.2596E−05 | 8.6259E−05 | 8.4125E−05 | 3.9313E−05 | 1.1338E−06 | −6.0901E−06 | −4.5471E−06 |
| S7 | −4.8433E−04 | −1.1094E−04 | 1.9529E−05 | 3.4142E−05 | 1.6113E−05 | 3.2584E−06 | 1.7497E−06 |
| S8 | 1.1660E−05 | 1.0799E−04 | 6.3197E−05 | 2.6448E−05 | −7.4788E−06 | −7.7443E−06 | −7.9277E−06 |
| S9 | 0.0000E+00 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 | 0.0000E+00 |
| S11 | −5.6962E−04 | −3.2731E−04 | −1.3723E−04 | 3.1423E−04 | 1.1041E−04 | −3.2664E−05 | −4.2125E−05 |
| S12 | 4.4907E−04 | −1.5774E−04 | 1.6753E−04 | 1.2795E−04 | −2.1299E−04 | 6.7060E−05 | 1.1420E−05 |
| S13 | −3.3217E−03 | −1.5345E−03 | 2.0361E−03 | −1.8103E−03 | 5.4985E−04 | −1.5150E−04 | −9.3903E−05 |
| S14 | 7.1658E−04 | −9.3576E−03 | 1.1449E−03 | −7.2629E−04 | 1.1224E−03 | −2.3186E−03 | −1.0207E−03 |

Figure 8A:
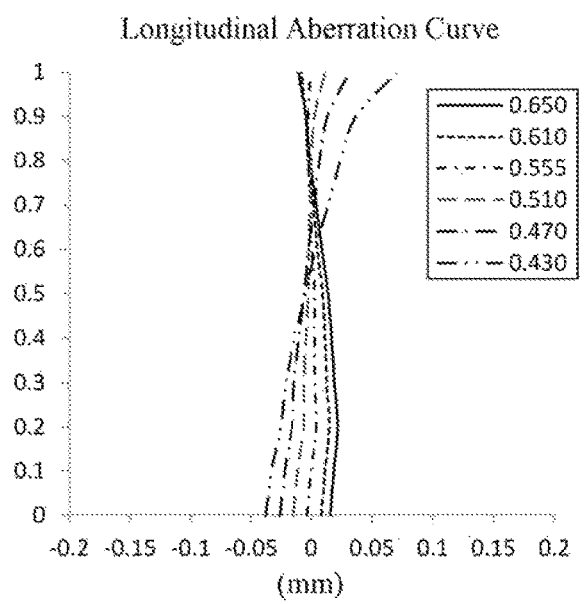
FIGS. 8A to 8C respectively show a longitudinal aberration curve, an astigmatic curve and a distortion curve of the optical imaging system according to Embodiment 4.
Figure 8B:
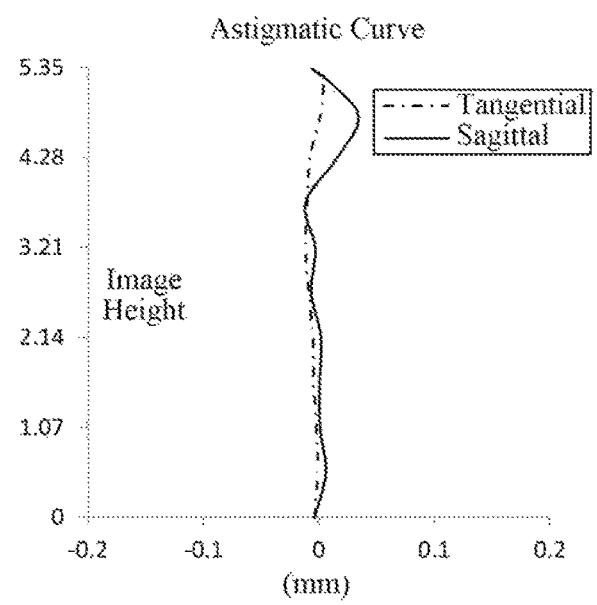
Figure 8C:
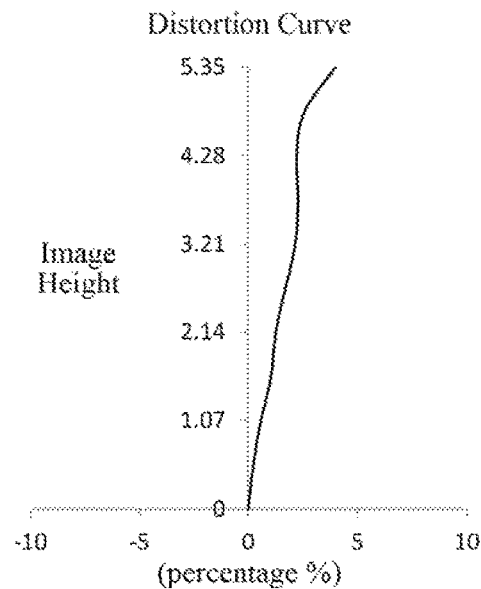

FIG. 8A illustrates a longitudinal aberration curve of the optical imaging system according to Embodiment 4, representing deviations of focal points of light of different wavelengths converged after passing through the system. FIG. 8B illustrates an astigmatic curve of the optical imaging system according to Embodiment 4, representing a curvature of a tangential image plane and a curvature of a sagittal image plane. FIG. 8C illustrates a distortion curve of the optical imaging system according to Embodiment 4, representing amounts of distortion corresponding to different image heights. It can be seen from FIGS. 8A to 8C that the optical imaging system given in Embodiment 4 can achieve a good imaging quality.

Embodiment 5

Figure 9:
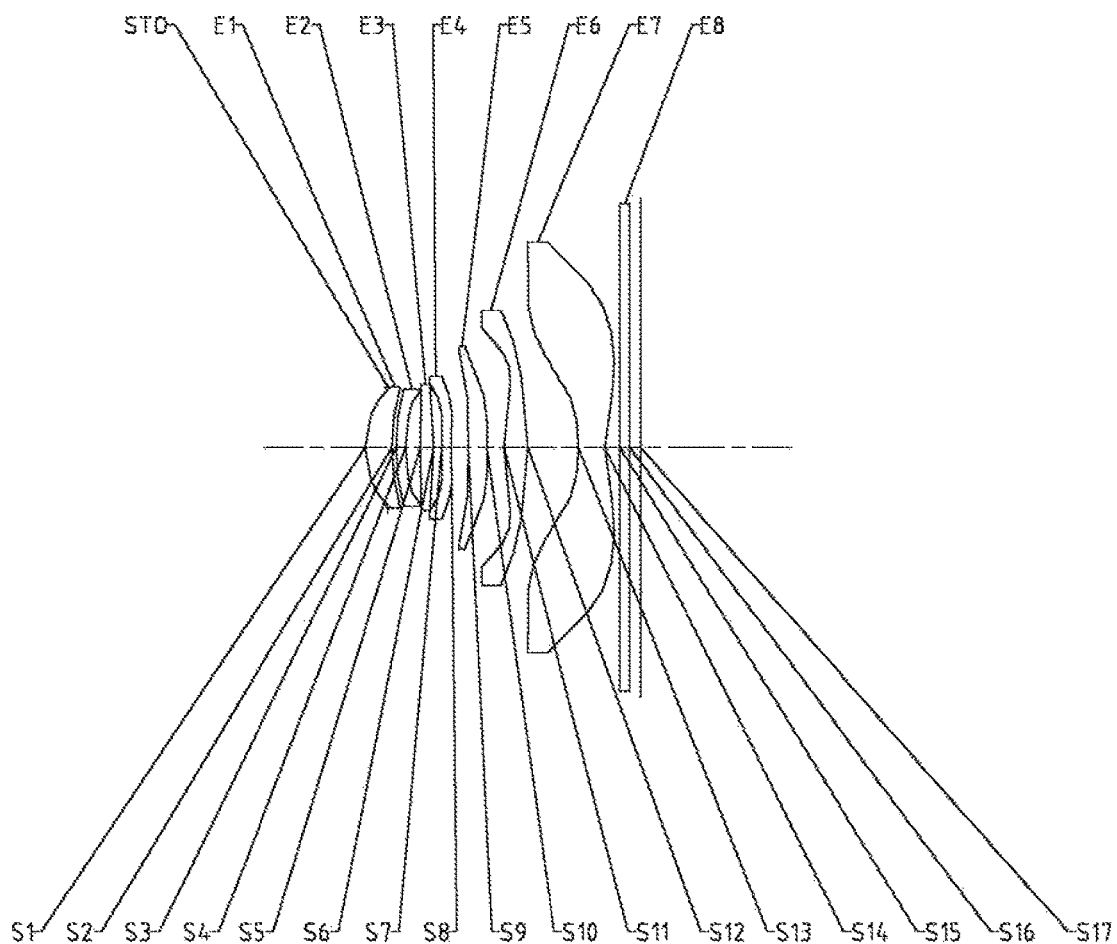
FIG. 9 is a schematic structural diagram of an optical imaging system according to Embodiment 5 of the present disclosure.

An optical imaging system according to Embodiment 5 of the present disclosure is described below with reference to FIGS. 9 to 10C. FIG. 9 is a schematic structural diagram of the optical imaging system according to Embodiment 5 of the present disclosure.

As shown in FIG. 9, the optical imaging system includes, sequentially along an optical axis from an object side to an image side: a stop STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. The optical imaging system has an image plane S17, light from an object sequentially passes through the surfaces S1 to S16 and finally forms an image on the image plane S17.

In Embodiment 5, a total effective focal length f of the optical imaging system is 4.73 mm. A distance TTL from the object-side surface S1 of the first lens E1 to the image plane S17 on the optical axis is 5.88 mm. Half of a maximal field-of-view Semi-FOV of the optical imaging system is 47.4°. Half of a diagonal length ImgH of an effective pixel area on the image plane S17 is 5.35 mm.

Table 9 is a table showing basic parameters of the optical imaging system in Embodiment 5. Here, the units of a radius of curvature, a thickness and a focal length are millimeters (mm). Table 10 shows the high-order coefficients applicable to the aspheric surfaces in Embodiment 5. Here, the surface type of each aspheric surface may be defined using the formula (1) given in Embodiment 1.

TABLE 9

| surface number | surface type | radius of curvature | thickness | refractive index | abbe number | focal length | conic coefficient |
|---|---|---|---|---|---|---|---|
| OBJ | spherical | infinite | infinite | | | | |
| STO | spherical | infinite | −0.4823 | | | | |
| S1 | aspheric | 2.0239 | 0.5676 | 1.59 | 61.2 | 5.73 | 0.2309 |
| S2 | aspheric | 4.5025 | 0.0951 | | | | 0.9638 |
| S3 | aspheric | 5.3288 | 0.2000 | 1.68 | 19.2 | −22.15 | 8.4750 |
| S4 | aspheric | 3.8722 | 0.3141 | | | | 7.0006 |
| S5 | aspheric | 32.5984 | 0.2847 | 1.54 | 55.7 | 90.01 | −90.0000 |
| S6 | aspheric | 100.0000 | 0.1692 | | | | −90.0000 |
| S7 | aspheric | 8.1666 | 0.2000 | 1.68 | 19.2 | −76.93 | −69.2251 |
| S8 | aspheric | 6.9898 | 0.3681 | | | | −71.2797 |
| S9 | aspheric | 15.8115 | 0.3977 | 1.54 | 55.7 | −100.00 | 29.4477 |
| S10 | aspheric | 12.1054 | 0.3626 | | | | 0.0000 |
| S11 | aspheric | 5.3049 | 0.5049 | 1.54 | 55.7 | 4.39 | 0.0000 |
| S12 | aspheric | −4.1027 | 1.0909 | | | | −1.1847 |
| S13 | aspheric | −7.3515 | 0.5659 | 1.54 | 55.7 | −3.30 | 1.5071 |
| S14 | aspheric | 2.3954 | 0.3236 | | | | −0.7294 |
| S15 | spherical | infinite | 0.2100 | 1.52 | 64.2 | | |
| S16 | spherical | infinite | 0.2285 | | | | |
| S17 | spherical | infinite | | | | | |

TABLE 10

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.5507E−02 | 3.9073E−03 | 9.0597E−04 | 2.2745E−04 | 4.1995E−05 | 0.0000E+00 | 0.0000E+00 |
| S2 | −1.5842E−02 | 7.6495E−03 | −3.1763E−04 | −4.0345E−04 | −2.3992E−04 | −9.3523E−05 | −1.2223E−05 |
| S3 | −2.1440E−02 | 1.1430E−02 | −1.9669E−03 | −5.6871E−04 | −3.2980E−04 | −1.0368E−04 | −2.0527E−05 |
| S4 | 1.7012E−02 | 1.1579E−02 | 2.1150E−04 | 1.6054E−04 | −7.4488E−05 | −3.9459E−05 | 4.7728E−06 |
| S5 | −2.8777E−02 | 5.3791E−03 | 2.8189E−03 | 9.9537E−04 | 7.9704E−05 | −4.0644E−05 | 1.0457E−06 |
| S6 | −9.5942E−02 | 8.8735E−03 | 5.8858E−03 | 2.2816E−03 | −5.8800E−04 | −9.2521E−04 | −5.5072E−04 |
| S7 | −3.0885E−01 | 1.9293E−03 | 1.0639E−02 | 5.6051E−03 | 4.7226E−04 | −8.9469E−04 | −8.7057E−04 |
| S8 | −3.2391E−01 | 1.1258E−02 | 1.3396E−02 | 5.1287E−03 | 7.7707E−05 | −5.8317E−04 | −3.5159E−04 |
| S9 | −4.1129E−01 | 6.9721E−02 | −1.4496E−02 | 9.4768E−03 | −2.3384E−03 | 0.0000E+00 | 0.0000E+00 |
| S10 | −8.2811E−01 | 2.0260E−01 | −3.9608E−02 | −2.9270E−03 | 1.4125E−03 | 2.0350E−05 | 0.0000E+00 |
| S11 | −1.1522E+00 | −6.8929E−02 | 6.3620E−02 | 8.0132E−03 | 6.0296E−03 | −7.3436E−04 | −5.0729E−04 |
| S12 | 6.0012E−01 | −2.0745E−01 | 7.6088E−02 | −2.7461E−02 | 9.7271E−03 | 1.1874E−03 | −1.6283E−03 |
| S13 | 1.4955E−02 | 7.5734E−01 | −4.3447E−01 | 2.2647E−01 | −8.4724E−02 | 1.2130E−02 | 6.1054E−03 |
| S14 | −8.1213E+00 | 7.6035E−01 | −4.2692E−01 | 1.5528E−01 | −9.3200E−02 | 5.8002E−03 | −3.0623E−02 |

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | 9.0200E−06 | 9.9957E−06 | −6.1234E−07 | −2.9329E−06 | −2.7078E−06 | 2.6576E−06 | 1.2150E−06 |

TABLE 10-continued

| | | | | | | | |
|---|---|---|---|---|---|---|---|
| S3 | 8.2691E−06 | 3.0903E−06 | 2.1168E−06 | −1.6300E−06 | 3.8023E−07 | −9.7033E−07 | 1.8567E−06 |
| S4 | 1.2652E−05 | 1.0952E−05 | 0.0000E+00 | 0.0000E+00 | 0.0000E+00 | 0.0000E+00 | 0.0000E+00 |
| S5 | 5.0346E−05 | 5.1183E−05 | 2.5789E−05 | 7.8704E−06 | −2.6997E−06 | −3.6581E−06 | −4.6516E−06 |
| S6 | −1.2296E−04 | 7.4666E−05 | 8.6899E−05 | 4.7207E−05 | 6.2521E−06 | −4.6093E−06 | −7.3806E−06 |
| S7 | −4.0382E−04 | −7.5841E−05 | 3.3845E−05 | 3.9447E−05 | 1.3619E−05 | −2.3607E−06 | −2.6780E−06 |
| S8 | −4.0705E−05 | 9.6617E−05 | 6.6579E−05 | 3.7081E−05 | −1.3740E−06 | −5.3500E−06 | −8.1128E−06 |
| S9 | 0.0000E+00 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 | 0.0000E+00 |
| S11 | −5.6962E−04 | −3.2731E−04 | −1.3723E−04 | 3.1423E−04 | 1.1041E−04 | −3.2664E−05 | −4.2125E−05 |
| S12 | 7.7552E−04 | −1.2849E−04 | 4.4199E−05 | 1.3484E−04 | −1.6819E−04 | 6.4744E−05 | 1.8795E−06 |
| S13 | −3.5893E−03 | −1.8627E−03 | 3.1316E−03 | −2.1540E−03 | 6.1759E−04 | −2.0551E−05 | −9.3779E−05 |
| S14 | 2.1446E−03 | −8.0442E−03 | 3.1479E−03 | −7.0764E−05 | 1.4960E−03 | −2.0848E−03 | −7.6967E−04 |

Figure 10A:
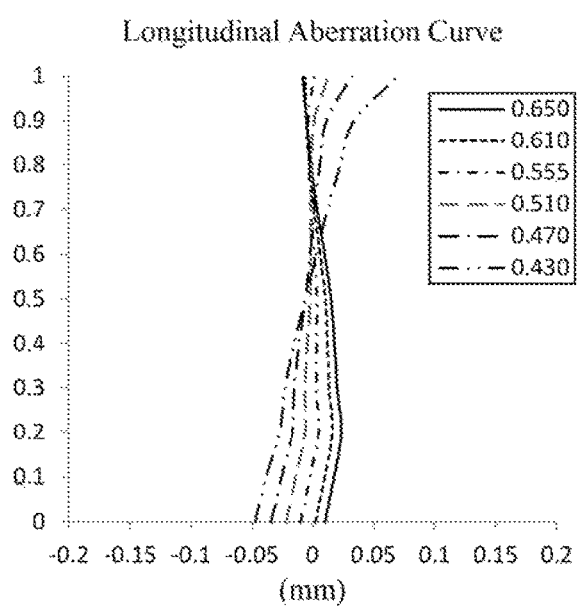
FIGS. 10A to 10C respectively show a longitudinal aberration curve, an astigmatic curve and a distortion curve of the optical imaging system according to Embodiment 5.
Figure 10B:
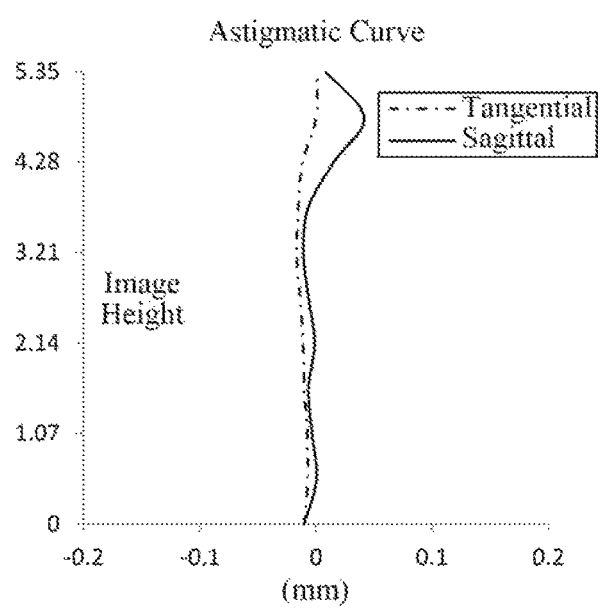
Figure 10C:
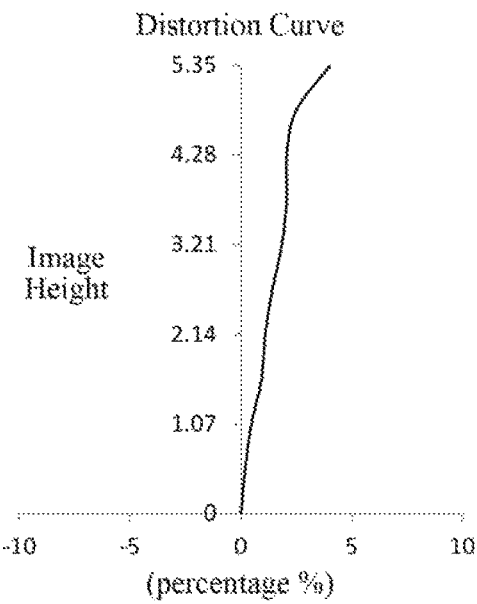

FIG. 10A illustrates a longitudinal aberration curve of the optical imaging system according to Embodiment 5, representing deviations of focal points of light of different wavelengths converged after passing through the system. FIG. 10B illustrates an astigmatic curve of the optical imaging system according to Embodiment 5, representing a curvature of a tangential image plane and a curvature of a sagittal image plane. FIG. 10C illustrates a distortion curve of the optical imaging system according to Embodiment 5, representing amounts of distortion corresponding to different image heights. It can be seen from FIGS. 10A to 10C that the optical imaging system given in Embodiment 5 can achieve a good imaging quality.

Embodiment 6

Figure 11:
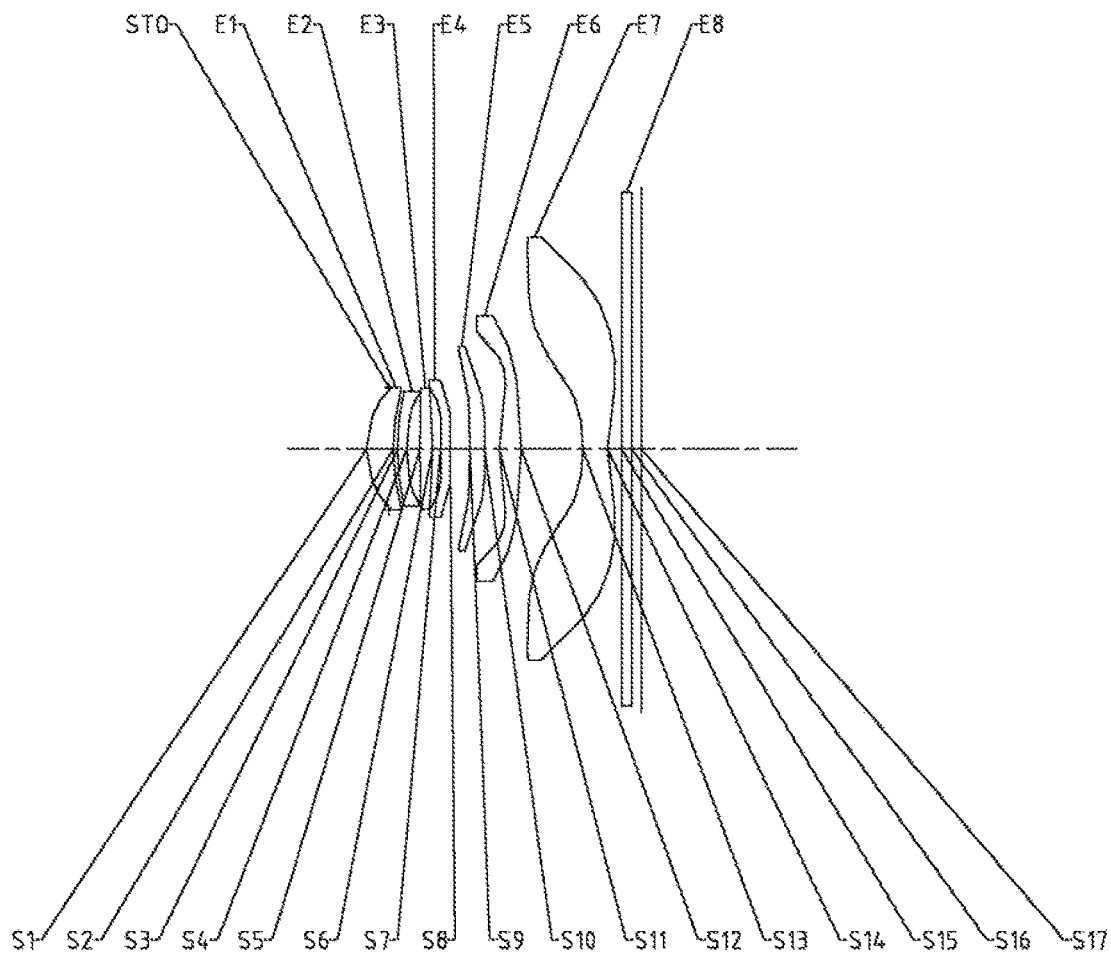
FIG. 11 is a schematic structural diagram of an optical imaging system according to Embodiment 6 of the present disclosure.

An optical imaging system according to Embodiment 6 of the present disclosure is described below with reference to FIGS. 11 to 12C. FIG. 11 is a schematic structural diagram of the optical imaging system according to Embodiment 6 of the present disclosure.

As shown in FIG. 11, the optical imaging system includes, sequentially along an optical axis from an object side to an image side: a stop STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. The optical imaging system has an image plane S17, light from an object sequentially passes through the surfaces S1 to S16 and finally forms an image on the image plane S17.

In Embodiment 6, a total effective focal length f of the optical imaging system is 4.92 mm. A distance TTL from the object-side surface S1 of the first lens E1 to the image plane S17 on the optical axis is 5.89 mm. Half of a maximal field-of-view Semi-FOV of the optical imaging system is 47.4°. Half of a diagonal length ImgH of an effective pixel area on the image plane S17 is 5.61 mm.

Table 11 is a table showing basic parameters of the optical imaging system in Embodiment 6. Here, the units of a radius of curvature, a thickness and a focal length are millimeters (mm). Table 12 shows the high-order coefficients applicable to the aspheric surfaces in Embodiment 6. Here, the surface type of each aspheric surface may be defined using the formula (1) given in Embodiment 1.

TABLE 11

| | | | | material | | | |
|---|---|---|---|---|---|---|---|
| surface number | surface type | radius of curvature | thickness | refractive index | abbe number | focal length | conic coefficient |
| OBJ | spherical | infinite | infinite | | | | |
| STO | spherical | infinite | −0.4871 | | | | |
| S1 | aspheric | 2.0129 | 0.5738 | 1.59 | 61.2 | 5.63 | 0.2313 |
| S2 | aspheric | 4.5579 | 0.0944 | | | | 1.5544 |
| S3 | aspheric | 5.5238 | 0.2000 | 1.68 | 19.2 | −19.87 | 9.1433 |
| S4 | aspheric | 3.8583 | 0.2820 | | | | 6.9016 |
| S5 | aspheric | 32.5792 | 0.2708 | 1.54 | 55.7 | 72.49 | 12.0223 |
| S6 | aspheric | 200.0000 | 0.1743 | | | | 90.0000 |
| S7 | aspheric | 11.1644 | 0.2000 | 1.68 | 19.2 | −89.83 | −90.0000 |
| S8 | aspheric | 9.3645 | 0.4280 | | | | −89.5755 |
| S9 | aspheric | 16.3273 | 0.3146 | 1.54 | 55.7 | −34.11 | −4.4925 |
| S10 | aspheric | 8.5716 | 0.3182 | | | | 0.0000 |
| S11 | aspheric | 5.1110 | 0.4721 | 1.54 | 55.7 | 4.60 | 0.0000 |
| S12 | aspheric | −4.6219 | 1.3045 | | | | −0.2334 |

TABLE 11-continued

| surface number | surface type | radius of curvature | thickness | material refractive index | abbe number | focal length | conic coefficient |
|---|---|---|---|---|---|---|---|
| S13 | aspheric | −7.2667 | 0.5349 | 1.54 | 55.7 | −3.34 | 1.5052 |
| S14 | aspheric | 2.4411 | 0.3021 | | | | −0.7267 |
| S15 | spherical | infinite | 0.2155 | 1.52 | 64.2 | | |
| S16 | spherical | infinite | 0.2070 | | | | |
| S17 | spherical | infinite | | | | | |

TABLE 12

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.6426E−02 | 4.4953E−03 | 1.1449E−03 | 3.0098E−04 | 6.8863E−05 | 0.0000E+00 | 0.0000E+00 |
| S2 | −1.4269E−02 | 8.3185E−03 | −1.6765E−04 | −3.4848E−04 | −2.7762E−04 | −1.4205E−04 | −6.1170E−05 |
| S3 | −2.0293E−02 | 1.1300E−02 | −2.2157E−03 | −6.9198E−04 | −4.4788E−04 | −2.0506E−04 | −7.5279E−05 |
| S4 | 1.5757E−02 | 1.1818E−02 | 2.5474E−04 | 2.7330E−04 | −9.5329E−05 | −7.2196E−05 | −3.0404E−05 |
| S5 | −1.7602E−02 | 7.5299E−03 | 3.0155E−03 | 1.1445E−03 | 2.2693E−04 | 9.2949E−05 | 7.1311E−05 |
| S6 | −7.6236E−02 | 1.0324E−02 | 3.9403E−03 | 4.3179E−04 | −1.6236E−03 | −1.2134E−03 | −4.5150E−04 |
| S7 | −3.0636E−01 | 4.0295E−03 | 1.0275E−02 | 3.6013E−03 | −1.1602E−03 | −2.1536E−03 | −1.4372E−03 |
| S8 | −3.2250E−01 | 1.7563E−02 | 1.6435E−02 | 5.8323E−03 | 4.4035E−04 | −5.8901E−04 | −2.2604E−04 |
| S9 | −4.2908E−01 | 8.1046E−02 | −1.4731E−02 | 9.1726E−03 | −2.1848E−03 | 0.0000E+00 | 0.0000E+00 |
| S10 | −8.8227E−01 | 2.2431E−01 | −4.9725E−02 | 1.0215E−02 | 2.0906E−03 | 3.1700E−05 | 0.0000E+00 |
| S11 | −1.1714E+00 | −6.6057E−02 | 6.6760E−02 | 8.7370E−03 | 6.1086E−03 | −9.4154E−04 | −6.4249E−04 |
| S12 | 4.7664E−01 | −2.1376E−01 | 8.8640E−02 | −2.4587E−02 | 8.4498E−03 | 3.5908E−03 | −6.5334E−04 |
| S13 | 1.1881E−01 | 7.9889E−01 | −4.4989E−01 | 2.5241E−01 | −9.5100E−02 | 2.7653E−02 | −3.8374E−03 |
| S14 | −8.2595E+00 | 8.9053E−01 | −4.9727E−01 | 1.5731E−01 | −9.3201E−02 | 3.4624E−02 | −2.1943E−02 |

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | −2.3386E−05 | −9.7299E−06 | −8.4169E−06 | −6.4396E−06 | −7.2038E−06 | −5.8650E−06 | −3.7141E−06 |
| S3 | −3.5483E−05 | −1.9132E−05 | −1.4713E−05 | −8.8232E−06 | −7.3389E−06 | −5.8590E−06 | −4.6492E−06 |
| S4 | −1.3676E−05 | −6.9563E−06 | 0.0000E+00 | 0.0000E+00 | 0.0000E+00 | 0.0000E+00 | 0.0000E+00 |
| S5 | 5.1604E−05 | 9.0051E−06 | −2.5469E−05 | −3.0336E−05 | −2.4030E−05 | −1.2401E−05 | −7.1578E−06 |
| S6 | 5.2465E−05 | 1.5867E−04 | 8.9387E−05 | 1.3585E−05 | −2.0182E−05 | −1.6595E−05 | −7.3963E−06 |
| S7 | −6.0698E−04 | −8.4674E−05 | 3.9424E−05 | 4.9812E−05 | 8.5597E−06 | −1.0455E−06 | −3.1157E−06 |
| S8 | 5.6350E−05 | 1.6872E−04 | 6.5310E−05 | 1.6154E−05 | −3.1524E−05 | −1.9099E−05 | −1.4375E−05 |
| S9 | 0.0000E+00 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 | 0.0000E+00 |
| S11 | −6.2682E−04 | −3.1052E−04 | −7.8283E−05 | 3.5264E−04 | 1.0274E−04 | −4.8414E−05 | −4.7810E−05 |
| S12 | 6.8332E−04 | −2.8582E−04 | 1.5657E−04 | 2.0477E−04 | −1.8026E−04 | 6.8775E−05 | 2.3705E−05 |
| S13 | 2.7952E−05 | −2.0796E−03 | 3.3378E−03 | −2.5412E−03 | 1.1963E−03 | −3.1910E−04 | 4.8109E−05 |
| S14 | 1.1372E−02 | −1.0330E−02 | 1.5925E−03 | −3.3390E−03 | 2.0739E−03 | −8.2752E−04 | 2.4985E−04 |

Figures 12A, 12B:
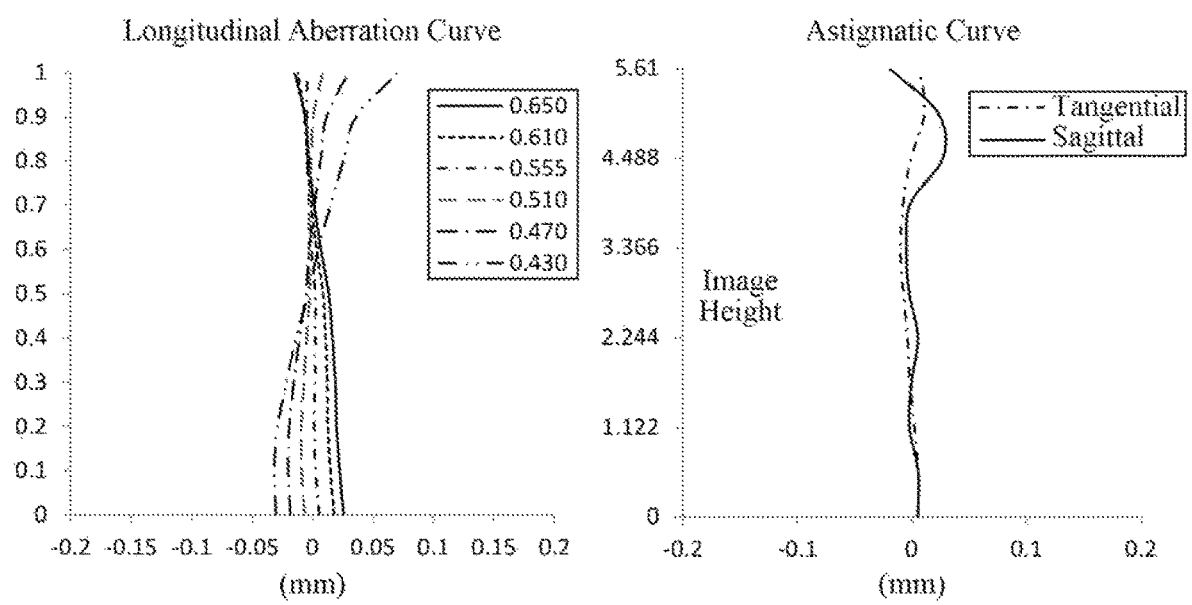
FIGS. 12A to 12C respectively show a longitudinal aberration curve, an astigmatic curve and a distortion curve of the optical imaging system according to Embodiment 6.
Figure 12C:
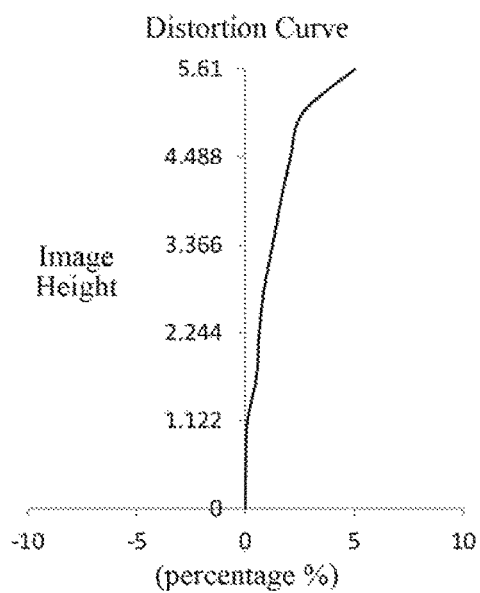

FIG. 12A illustrates a longitudinal aberration curve of the optical imaging system according to Embodiment 6, representing deviations of focal points of light of different wavelengths converged after passing through the system. FIG. 12B illustrates an astigmatic curve of the optical imaging system according to Embodiment 6, representing a curvature of a tangential image plane and a curvature of a sagittal image plane. FIG. 12C illustrates a distortion curve of the optical imaging system according to Embodiment 6, representing amounts of distortion corresponding to different image heights. It can be seen from FIGS. 12A to 12C that the optical imaging system given in Embodiment 6 can achieve a good imaging quality.

Embodiment 7

An optical imaging system according to Embodiment 7 of the present disclosure is described below with reference to FIGS. 13 to 14C. FIG. 13 is a schematic structural diagram of the optical imaging system according to Embodiment 7 of the present disclosure.

As shown in FIG. 13, the optical imaging system includes, sequentially along an optical axis from an object side to an image side: a stop STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. The optical imaging system has an image plane S17, light from an object sequentially passes through the surfaces S1 to S16 and finally forms an image on the image plane S17.

In Embodiment 7, a total effective focal length f of the optical imaging system is 4.88 mm. A distance TTL from the object-side surface S1 of the first lens E1 to the image plane S17 on the optical axis is 5.91 mm. Half of a maximal field-of-view Semi-FOV of the optical imaging system is 47.4°. Half of a diagonal length ImgH of an effective pixel area on the image plane S17 is 5.53 mm.

Table 13 is a table showing basic parameters of the optical imaging system in Embodiment 7. Here, the units of a radius of curvature, a thickness and a focal length are millimeters (mm). Table 14 shows the high-order coefficients applicable to the aspheric surfaces in Embodiment 7. Here, the surface type of each aspheric surface may be defined using the formula (1) given in Embodiment 1.

TABLE 13

| surface number | surface type | radius of curvature | thickness | material refractive index | abbe number | focal length | conic coefficient |
|---|---|---|---|---|---|---|---|
| OBJ | spherical | infinite | infinite | | | | |
| STO | spherical | infinite | −0.4765 | | | | |
| S1 | aspheric | 2.0138 | 0.5638 | 1.59 | 61.2 | 5.65 | 0.2326 |
| S2 | aspheric | 4.5445 | 0.0987 | | | | 1.8180 |
| S3 | aspheric | 5.5191 | 0.2000 | 1.68 | 19.2 | −19.90 | 9.4100 |
| S4 | aspheric | 3.8579 | 0.2805 | | | | 6.8920 |
| S5 | aspheric | 28.8245 | 0.2765 | 1.54 | 55.7 | 62.73 | −43.2649 |
| S6 | aspheric | 200.0000 | 0.1744 | | | | −90.0000 |
| S7 | aspheric | 10.8339 | 0.2000 | 1.68 | 19.2 | −80.24 | −90.0000 |
| S8 | aspheric | 8.9651 | 0.4204 | | | | −90.0000 |
| S9 | aspheric | 16.8914 | 0.3309 | 1.54 | 55.7 | −36.55 | 4.7953 |
| S10 | aspheric | 9.0131 | 0.3281 | | | | 0.0000 |
| S11 | aspheric | 5.0088 | 0.4798 | 1.54 | 55.7 | 4.59 | 0.0000 |
| S12 | aspheric | −4.6765 | 1.2810 | | | | −0.2323 |
| S13 | aspheric | −7.2484 | 0.5479 | 1.54 | 55.7 | −3.34 | 1.5070 |
| S14 | aspheric | 2.4435 | 0.3040 | | | | −0.7268 |
| S15 | spherical | infinite | 0.2155 | 1.52 | 64.2 | | |
| S16 | spherical | infinite | 0.2089 | | | | |
| S17 | spherical | infinite | | | | | |

TABLE 14

| surface number | $A_4$ | $A_6$ | $A_8$ | $A_{10}$ | $A_{12}$ | $A_{14}$ | $A_{16}$ |
|---|---|---|---|---|---|---|---|
| S1 | 1.6597E−02 | 4.4533E−03 | 1.1204E−03 | 2.8119E−04 | 5.9353E−05 | 0.0000E+00 | 0.0000E+00 |
| S2 | −1.3255E−02 | 7.9609E−03 | −1.5524E−04 | −3.9033E−04 | −2.8526E−04 | −1.5017E−04 | −6.0400E−05 |
| S3 | −1.9371E−02 | 1.1304E−02 | −2.1542E−03 | −7.0292E−04 | −4.5457E−04 | −2.0464E−04 | −8.0295E−05 |
| S4 | 1.5189E−02 | 1.1950E−02 | 3.1961E−04 | 2.7395E−04 | −8.3008E−05 | −6.7316E−05 | −2.5984E−05 |
| S5 | −1.8164E−02 | 7.4347E−03 | 2.8761E−03 | 1.1213E−03 | 1.8709E−04 | 9.5806E−05 | 5.7878E−05 |
| S6 | −8.0182E−02 | 9.6013E−03 | 4.1076E−03 | 4.6127E−04 | −1.6715E−03 | −1.3094E−03 | −5.1150E−04 |
| S7 | −3.1137E−01 | 3.9844E−03 | 1.0250E−02 | 3.8315E−03 | −1.1438E−03 | −2.1087E−03 | −1.4717E−03 |
| S8 | −3.2074E−01 | 1.8099E−02 | 1.5928E−02 | 5.5389E−03 | 2.9754E−04 | −5.7213E−04 | −2.1282E−04 |
| S9 | −4.2449E−01 | 8.1649E−02 | −1.5660E−02 | 9.2790E−03 | −2.3313E−03 | 0.0000E+00 | 0.0000E+00 |
| S10 | −8.8227E−01 | 2.2431E−01 | −4.9725E−02 | 1.0215E−03 | 2.0906E−03 | 3.1700E−05 | 0.0000E+00 |
| S11 | −1.1714E+00 | −6.6057E−02 | 6.6760E−02 | 8.7370E−03 | 6.1086E−03 | −9.4154E−04 | −6.4249E−04 |
| S12 | 4.7574E−01 | −2.0779E−01 | 8.7693E−02 | −2.4956E−02 | 8.0902E−03 | 3.3139E−03 | −1.0142E−03 |
| S13 | 1.3977E−01 | 8.0951E−01 | −4.4865E−01 | 2.5216E−01 | −9.5932E−02 | 2.6586E−02 | −3.7066E−03 |
| S14 | −8.1874E+00 | 8.8257E−01 | −4.7275E−01 | 1.5962E−01 | −9.6688E−02 | 3.1113E−02 | −2.2041E−02 |

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | −2.4908E−05 | −8.9416E−06 | −6.1366E−06 | −2.9622E−06 | −3.9403E−06 | −2.1003E−06 | −1.9760E−06 |
| S3 | −3.7935E−05 | −2.3475E−05 | −1.5754E−05 | −1.1526E−05 | −8.6150E−06 | −7.3510E−06 | −2.9786E−06 |
| S4 | −1.2505E−05 | −5.2351E−06 | 0.0000E+00 | 0.0000E+00 | 0.0000E+00 | 0.0000E+00 | 0.0000E+00 |
| S5 | 4.9347E−05 | −6.5379E−06 | −3.6512E−05 | −4.5796E−05 | −3.2612E−05 | −1.8727E−05 | −6.9637E−06 |
| S6 | 3.3056E−05 | 1.7460E−04 | 1.1180E−04 | 3.1505E−05 | −1.2505E−05 | −1.2811E−05 | −6.9312E−06 |
| S7 | −6.1889E−04 | −1.0932E−04 | 4.4732E−05 | 4.9750E−05 | 1.9466E−05 | 1.8850E−06 | 1.6420E−06 |
| S8 | 6.1135E−05 | 1.5756E−04 | 6.5941E−05 | 1.6227E−05 | −2.5665E−05 | −1.7057E−05 | −1.2047E−05 |
| S9 | 0.0000E+00 | 0.0000E+00 | 0.0000E+00 | 0.0000E+00 | 0.0000E+00 | 0.0000E+00 | 0.0000E+00 |
| S10 | 0.0000E+00 | 0.0000E+00 | 0.0000E+00 | 0.0000E+00 | 0.0000E+00 | 0.0000E+00 | 0.0000E+00 |

TABLE 14-continued

| | | | | | | | |
|---|---|---|---|---|---|---|---|
| S11 | −6.2682E−04 | −3.1052E−04 | −7.8283E−05 | 3.5264E−04 | 1.0274E−04 | −4.8414E−05 | −4.7810E−05 |
| S12 | 5.4980E−04 | −3.4379E−04 | 1.9545E−04 | 2.0751E−04 | −1.9038E−04 | 4.4546E−05 | 2.8913E−05 |
| S13 | 5.4042E−04 | −2.1207E−03 | 3.4999E−03 | −2.7357E−03 | 1.3619E−03 | −3.3324E−04 | 2.8833E−05 |
| S14 | 1.0593E−02 | −1.0500E−02 | 1.3457E−03 | −2.7204E−03 | 2.2260E−03 | −4.9426E−04 | 1.2800E−04 |

Figure 14C:
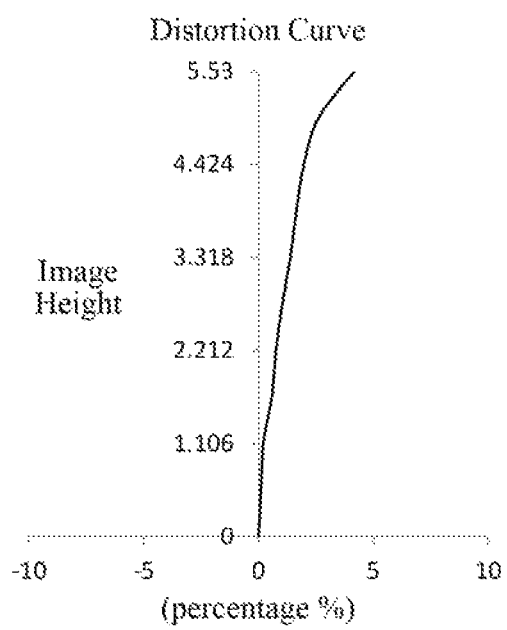

FIG. 14A illustrates a longitudinal aberration curve of the optical imaging system according to Embodiment 7, representing deviations of focal points of light of different wavelengths converged after passing through the system. FIG. 14B illustrates an astigmatic curve of the optical imaging system according to Embodiment 7, representing a curvature of a tangential image plane and a curvature of a sagittal image plane. FIG. 14C illustrates a distortion curve of the optical imaging system according to Embodiment 7, representing amounts of distortion corresponding to different image heights. It can be seen from FIGS. 14A to 14C that the optical imaging system given in Embodiment 7 can achieve a good imaging quality.

In summary, Embodiments 1-7 respectively satisfy the relationships shown in Table 15.

TABLE 15

| conditional expression | embodiment | | | | | | |
|---|---|---|---|---|---|---|---|
| | 1 | 2 | 3 | 4 | 5 | 6 | 7 |
| $|f4/f2 - f3/f2|$ | 6.41 | 9.62 | 5.44 | 5.49 | 7.54 | 8.17 | 7.18 |
| f/EPD | 1.93 | 1.93 | 1.93 | 1.86 | 1.86 | 1.93 | 1.93 |
| $|f1/f6 - f1/f7|$ | 2.89 | 2.87 | 3.00 | 3.01 | 3.04 | 2.91 | 2.93 |
| (R2 + R1)/(R2 − R1) | 2.62 | 2.50 | 2.68 | 2.59 | 2.63 | 2.58 | 2.59 |
| R7/f + R8/f | 7.58 | 4.16 | 4.92 | 3.59 | 3.21 | 4.18 | 4.06 |
| R13/R14 | −2.99 | −3.01 | −3.01 | −3.09 | −3.07 | −2.98 | −2.97 |
| T67/T45 | 2.54 | 2.78 | 2.68 | 2.83 | 2.96 | 3.05 | 3.05 |
| CT1/CT6 + CT1/CT7 | 2.34 | 2.37 | 2.13 | 2.15 | 2.13 | 2.29 | 2.20 |
| T23/(T12 + T34) | 1.36 | 1.15 | 1.19 | 1.15 | 1.19 | 1.05 | 1.03 |
| ΣAT/tan(Semi-FOV) | 2.31 | 2.41 | 2.29 | 2.20 | 2.21 | 2.39 | 2.38 |
| TTL/ImgH | 1.05 | 1.01 | 1.09 | 1.10 | 1.10 | 1.05 | 1.07 |

The present disclosure further provides an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. An optical imaging system, comprising, sequentially along an optical axis from an object side to an image side:
   a stop;
   a first lens, having a positive refractive power;
   a second lens, having negative refractive power;
   a third lens, having a positive refractive power or a negative refractive power;
   a fourth lens, having a negative refractive power, an object-side surface of the fourth lens is a convex surface;
   a fifth lens, having a negative refractive power;
   a sixth lens, having a positive refractive power or a negative refractive power; and
   a seventh lens, having a positive refractive power or a negative refractive power,
   wherein, one of the first to seventh lenses is an aspheric lens made of glass;
   an effective focal length f4 of the fourth lens, an effective focal length f2 of the second lens, and an effective focal length f3 of the third lens satisfy: $5.0 < |f4/f2 - f3/f2| < 10.0$; and
   a radius of curvature R2 of an image-side surface of the first lens and a radius of curvature R1 of an object-side surface of the first lens satisfy:
   $2.5 \leq (R2+R1)/(R2-R1) < 3.0$.

2. The optical imaging system according to claim 1, wherein half of a maximal field-of-view Semi-FOV of the optical imaging system satisfies: Semi-FOV≥45°.

3. The optical imaging system according to claim 1, wherein a total effective focal length f of the optical imaging system and an entrance pupil diameter EPD of the optical imaging system satisfy: f/EPD<2.0.

4. The optical imaging system according to claim 1, wherein an effective focal length f1 of the first lens, an effective focal length f6 of the sixth lens, and an effective focal length f7 of the seventh lens satisfy: $2.5 < |f1/f6 - f1/f7| < 3.5$.

5. The optical imaging system according to claim 1, wherein a spacing distance T23 between the second lens and the third lens on the optical axis, a spacing distance T12 between the first lens and the second lens on the optical axis, and a spacing distance T34 between the third lens and the fourth lens on the optical axis satisfy: $1.0 < T23/(T12+T34) < 1.5$.

6. The optical imaging system according to claim 1, wherein a radius of curvature R7 of the object-side surface of the fourth lens, a total effective focal length f of the optical imaging system, and a radius of curvature R8 of an image-side surface of the fourth lens satisfy: $3.0 < R7/f + R8/f < 8.0$.

7. The optical imaging system according to claim 1, wherein a radius of curvature R13 of an object-side surface of the seventh lens and a radius of curvature R14 of an image-side surface of the seventh lens satisfy: $-3.5 < R13/R14 < -2.5$.

8. The optical imaging system according to claim 1, wherein a spacing distance T67 between the sixth lens and the seventh lens on the optical axis and a spacing distance T45 between the fourth lens and the fifth lens on the optical axis satisfy: $2.5 < T67/T45 < 3.5$.

9. The optical imaging system according to claim 1, wherein a center thickness CT1 of the first lens on the optical axis, a center thickness CT6 of the sixth lens on the optical axis, and a center thickness CT7 of the seventh lens on the optical axis satisfy: 2.0<CT1/CT6+CT1/CT7<2.5.

10. The optical imaging system according to claim 1, wherein half of a diagonal length ImgH of an effective pixel area on an image plane of the optical imaging system satisfies: ImgH≥5.0 mm.

11. The optical imaging system according to claim 1, wherein a sum ΣAT of spacing distances between any two adjacent lenses in the first to seventh lenses on the optical axis, and half of a maximal field-of-view Semi-FOV of the optical imaging system satisfy: 1.0<ΣAT/tan(Semi-FOV)<3.0.

12. The optical imaging system according to claim 1, wherein a distance TTL from an object-side surface of the first lens to an image plane of the optical imaging system on the optical axis, and half of a diagonal length ImgH of an effective pixel area on the image plane of the optical imaging system satisfy: TTL/ImgH<1.2.

13. An optical imaging system, comprising, sequentially along an optical axis from an object side to an image side:
   a stop;
   a first lens, having a positive refractive power;
   a second lens, having a negative refractive power;
   a third lens, having a positive refractive power or a negative refractive power;
   a fourth lens, having a negative refractive power, an object-side surface of the fourth lens is a convex surface;
   a fifth lens, having a negative refractive power;
   a sixth lens, having a positive refractive power or a negative refractive power; and
   a seventh lens, having a positive refractive power or a negative refractive power,
   wherein, one of the first to seventh lenses is an aspheric lens made of glass;
   a number of lenses having refractive powers is seven;
   a radius of curvature R7 of the object-side surface of the fourth lens, a total effective focal length f of the optical imaging system, and a radius of curvature R8 of an image-side surface of the fourth lens satisfy: 3.0<R7/f+R8/f<8.0; and
   a center thickness CT1 of the first lens on the optical axis, a center thickness CT6 of the sixth lens on the optical axis, and a center thickness CT7 of the seventh lens on the optical axis satisfy: 2.0<CT1/CT6+CT1/CT7<2.5.

14. The optical imaging system according to claim 13, wherein half of a maximal field-of-view Semi-FOV of the optical imaging system satisfies: Semi-FOV≥45°.

15. The optical imaging system according to claim 13, wherein an effective focal length f4 of the fourth lens, an effective focal length f2 of the second lens, and an effective focal length f3 of the third lens satisfy: 5.0<|f4/f2−f3/f2|<10.0.

16. The optical imaging system according to claim 13, wherein the total effective focal length f of the optical imaging system and an entrance pupil diameter EPD of the optical imaging system satisfy: f/EPD<2.0.

17. The optical imaging system according to claim 13, wherein an effective focal length f1 of the first lens, an effective focal length f6 of the sixth lens, and an effective focal length f7 of the seventh lens satisfy: 2.5<|f1/f6−f1/f7|<3.5.

18. The optical imaging system according to claim 13, wherein a radius of curvature R13 of an object-side surface of the seventh lens and a radius of curvature R14 of an image-side surface of the seventh lens satisfy: −3.5<R13/R14<−2.5.

* * * * *